Oct. 26, 1954  W. B. STRICKLER  2,692,728
TESTING SYSTEM
Filed Dec. 17, 1946  16 Sheets-Sheet 3

| FIG. 5 PROBLEM DATA | | | |
|---|---|---|---|
| | FIG. 7 U | FIG. 8 ADDEND V | FIG. 9 W |
| | FIG. 12 U | FIG. 13 AUGEND V | FIG. 14 W |
| FIG. 6 MASTER CONTROL | | | |
| FIG. 10 INT. CONTROL | FIG. 11 CONTROL & CARRY IN LEADS | | |

INVENTOR
W. B. STRICKLER
BY John A. Hall
ATTORNEY

Oct. 26, 1954  W. B. STRICKLER  2,692,728
TESTING SYSTEM
Filed Dec. 17, 1946  16 Sheets-Sheet 4

FIG. 5

INVENTOR
W. B. STRICKLER
BY
John Attoll
ATTORNEY

Oct. 26, 1954

W. B. STRICKLER 2,692,728

TESTING SYSTEM

Filed Dec. 17, 1946

INVENTOR
W. B. STRICKLER
BY John A. Hall
ATTORNEY

Oct. 26, 1954  W. B. STRICKLER  2,692,728
TESTING SYSTEM
Filed Dec. 17, 1946  16 Sheets-Sheet 9

INVENTOR
W. B. STRICKLER
BY
ATTORNEY

Oct. 26, 1954

W. B. STRICKLER 2,692,728

TESTING SYSTEM

Filed Dec. 17, 1946

INVENTOR
W. B. STRICKLER
BY
ATTORNEY

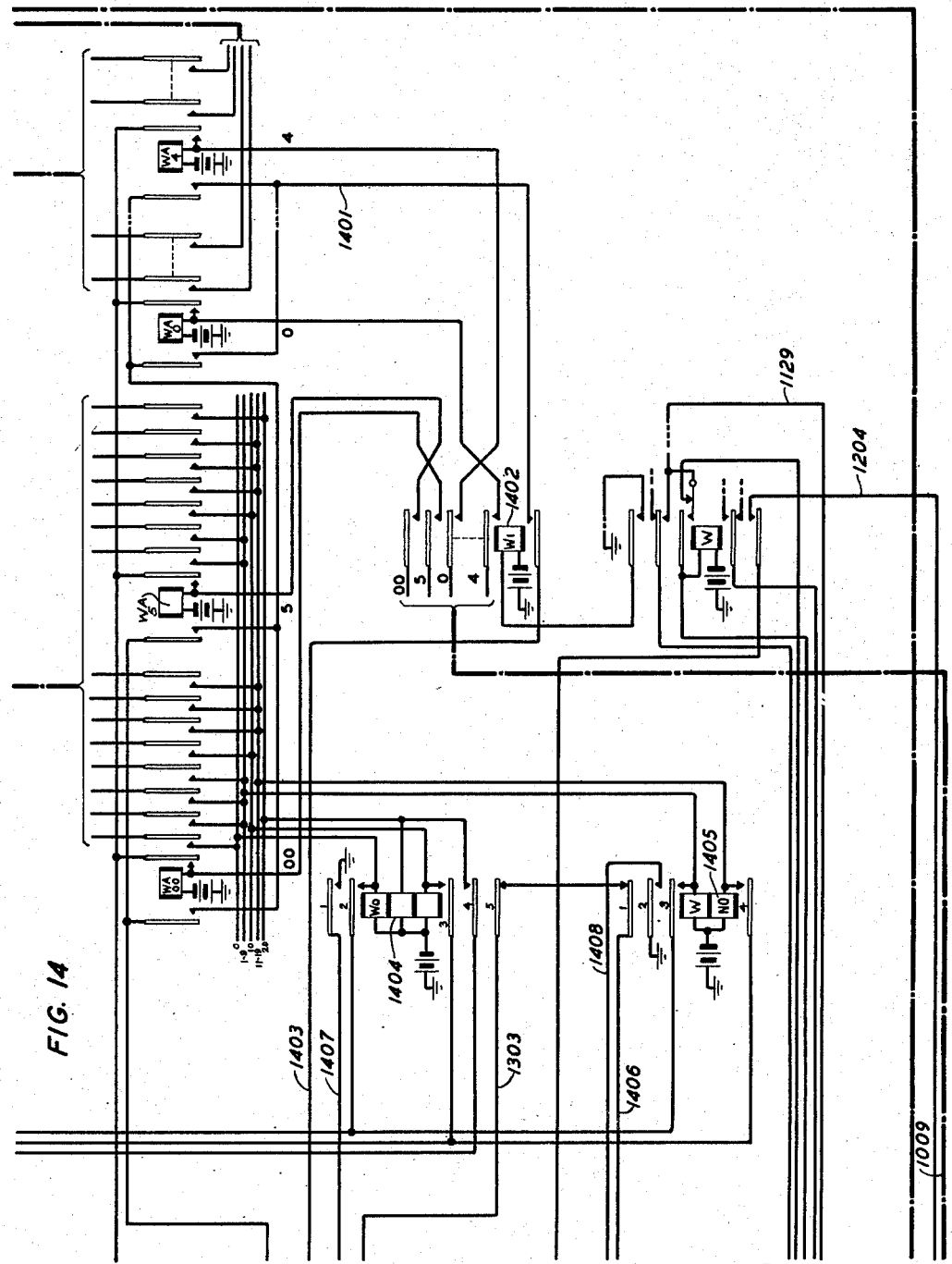

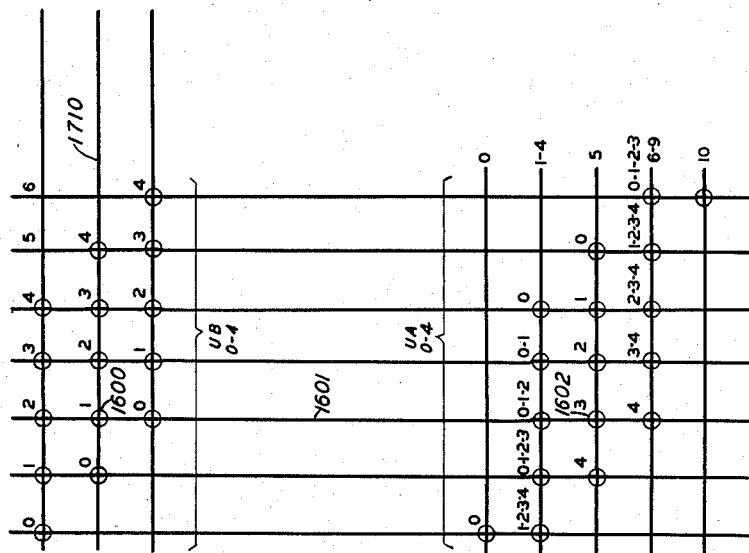
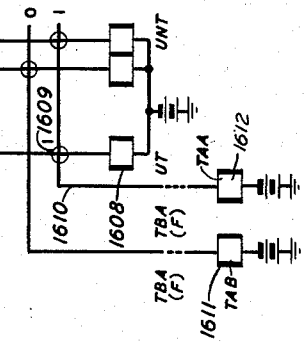

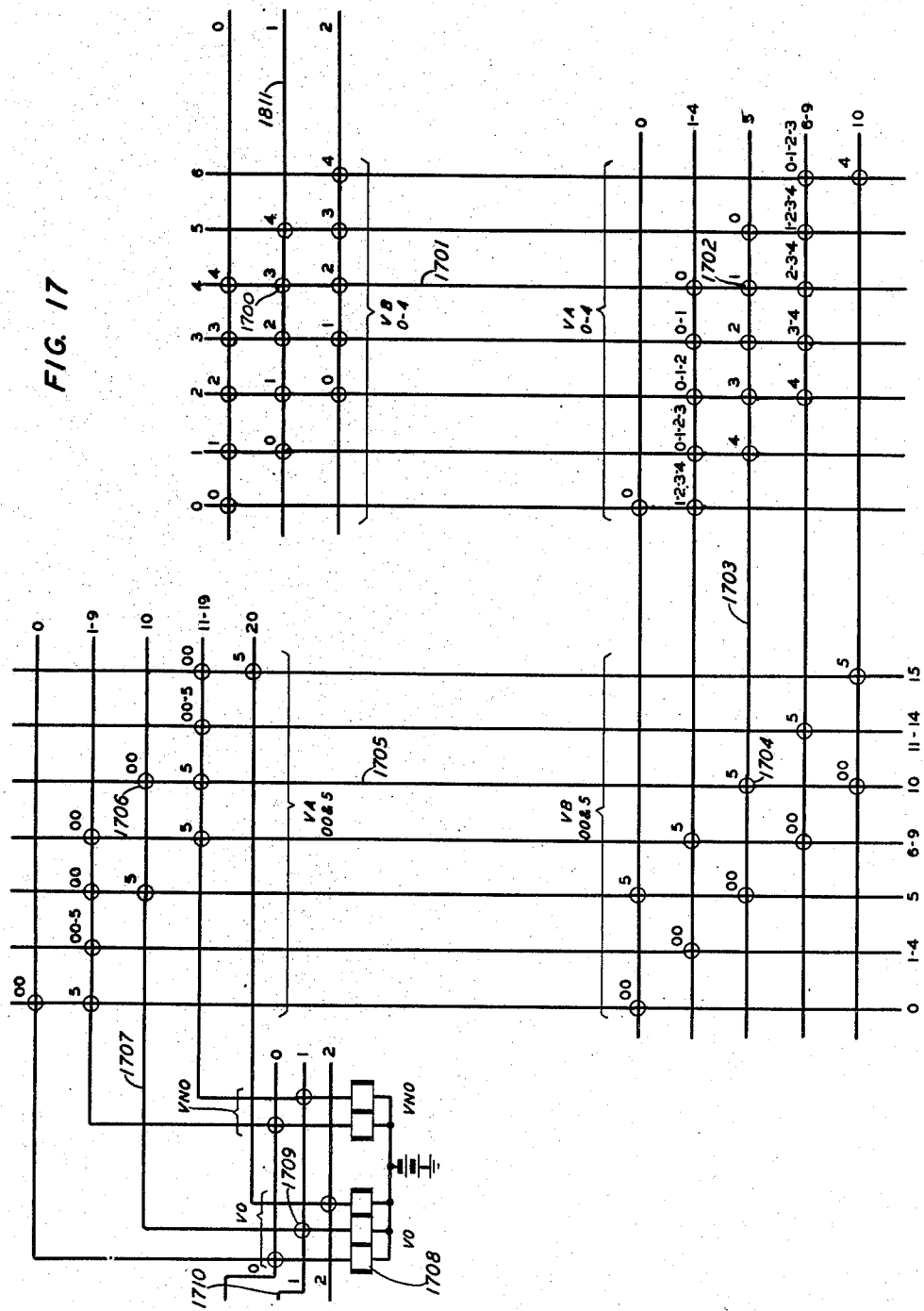

Patented Oct. 26, 1954

2,692,728

UNITED STATES PATENT OFFICE 2,692,728

TESTING SYSTEM

Walter B. Strickler, East Orange, N. J., assignor to Bell Telephone Laboratories, Incorporated, New York, N. Y., a corporation of New York Application December 17, 1946, Serial No. 716,783

20 Claims. (Cl. 235—61)

This invention relates to calculators and particularly to electrical devices by which mathematical calculations may be carried out by the movement of simple electromagnetic means without the use of gear trains, number wheels, cams or other such mechanical elements. Particularly the invention relates to testing systems where testing is accomplished basically by calculation.

An object of the invention is to provide calculating means which will perform long and complicated operations in a minimum of time and with a minimum of apparatus.

Another and more specific object of the invention is to provide means for testing an index to determine if a particular point therein has been reached and if not then in which direction it shall be moved in order to reach such a point.

Further, an object of the invention is to provide means for moving tapes forwardly or backwardly at high and slow speeds in order to reach a designated position thereon.

The device including the present invention is a tape controlled electrical calculator. Such a device employs a plurality of indices each in the form of a tape perforated with indicia representing and capable of translation into operational orders, numbers and other items of information. Generally speaking such a calculator is controlled in its pattern of operations by one or more routine tapes having operational orders indexed thereon, by a problem data tape having the arguments of a problem indexed therein, and a plurality of other problem data tapes having empirical data or known information such as that usually found in tables such as tables of sines, tangents, logarithms, ballistic coefficients, and so forth.

The data in all of these problem data tapes is indexed in so-called "blocks" much as the data in tables is divided into pages of a book or under a serially numbered arrangement for convenience in "looking up" a required item. Each block number in the present embodiment of the invention consists of a three-digit number and these numbers are serially arranged. Therefore to arrive at a particularly wanted item of information it is necessary to move the tape until such a particular block number has been found. This is done broadly by calculation. The wanted number is registered in one part of a calculator and the block numbers on the tape being scanned are compared thereto so that when one is subtracted from the other and a remainder of zero is found it is known that the particular item of information desired is at hand. If the remainder is other than zero, then the character of the remainder, that is its positive or negative sign, will determine in which direction to further move the tape.

A feature of the invention is means for testing by calculation. An adder or summing device is employed to control three signal circuits one of which will become effective when the sum of one number and the complement of the number being tested is zero, a second which will become effective when such sum is other than zero and is positive in character and a third which will become effective when such sum is other than zero and is negative in character.

As in prior calculating devices there are provided carry in and carry out paths for each decimal denominational order. Since in these calculators the nine's complement of a number is far easier to handle than the true or ten's complement, the fugitive one must be reckoned in the calculation. This means that when the nine's complement of a number is added to another number a one must be added to the result in order to give a true and accurate result. Therefore a carry in one circuit is provided, leading into the extreme right-hand decimal denominational order whereby a one is automatically reckoned into the sum of the values in the augend and addend elements of the adder. Thus if it is desired to find a block numbered 183, this number is registered in the augend element and the nine's complement of the block numbers being tested are registered in the addend element. When the block number 183 has been found the sum will appear as Augend 183
Carry in 1
Addend 816    the nine's complement of 183
Sum 1000

The one in the thousand's place of the sum becomes in actual practice a carry out one and may be used as a signal means. Thus this carry in one circuit is the means for adding in the fugitive one when the nine's complement of a number is being added to another number to automatically compensate for the error knowingly made by the use of the nine's complement.

Another feature of the invention is the use of a plurality of carry in leads each for reckoning in a different value. Let us suppose that a block number involved in a calculation is numbered 183. For the purposes of interpolation it is desired to take items of information from some other tape from four blocks numbered 182, 183, 184 and 185, respectively. For this purpose the number 183 is established as an augend and block 182 is tested by reckoning in a minus one. Thus

```
Augend    183
Carry in   −1
Addend    818   the complement of 182
          ———
Sum      1000
```

In actual practice, however, since the fugitive one must be reckoned in, this sum would appear as

```
Augend    183
Carry in    0
Addend    817   the nine's complement of 182
          ———
Sum      1000
```

Likewise if block 185 is to be tested then the sum would appear as

```
Augend    183
Carry in    3
Addend    814   the nine's complement of 185
          ———
Sum      1000
``` and a carry in three would have to be provided. While for practical purposes in the specific embodiment of the present invention there are four carry in leads for automatically reckoning in −1, 0, 1 and 2, the invention is not limited to such an arrangement but extends to and comprehends the use of a great number of carry in leads or the use of a carry in lead for representing some specific number of one or more digits in magnitude and of either positive or negative character. Another feature of the invention is therefore the use of negative carry in leads, that is leads which will reckon a negative number into a summing operation.

Speed in calculation is a desideratum and hence the movement of the tapes from one block number to another is of great importance. A feature of the invention is the provision of means for high speed movement of tapes combined with a means for reducing the speed of such movement as a block number is approached. For this purpose the circuits are so arranged that the adder is rendered insensitive to numbers indexed in a tape being thus moved at high speed. Other means are set to respond to certain special signals which are recorded in the tape just prior to the block numbers so that when such a signal is encountered the speed is reduced from a continuous high speed to a comparatively slow step-by-step action and the adder is rendered capable of responding to the codes then encountered. A feature of the invention is means responsive to a special signal indicating that the wanted codes are at hand to reduce the speed and render the testing means in the form of a calculator responsive to such codes. Another feature of the invention resides in the means for causing the tape to move forwardly on a step-by-step basis to read off the codes for the block number regardless of the direction in which the tape has been moving at high speed when such preparatory signal is encountered. The block numbers are always read off in one order so that if the tape is moving backwardly then the block number will be passed over before the special signal is reached whereupon the speed is reduced, the direction of movement is reversed and the block number tested. If the block number proves to be unsatisfactory the direction of travel is again reversed (responsive to the calculated sign) and the hunt again taken up at high speed. Another feature of the invention is therefore means effective while an index is moving in one direction to stop such movement and to start movement in the opposite direction to scan the indicia thereon.

Another feature of the invention is a means to blank out and render the stopping means unresponsive to the first stop signal encountered if the result of a test indicates that another hunting operation in a backward direction must be performed. It is obvious that where the tape must be moved backwardly on the start of a new hunting movement that a stop signal, the one which had just been employed, will be immediately encountered. If that signal were allowed to become effective the result would be to test again a block number which has just been tested and therefore no progress toward lower numbers could be made. Means are therefore provided responsive to the result of a previously made test indicating that the next test must be made through a backward movement of a tape to ride over a first stopping signal and to respond to a second of such signals.

In accordance with this feature, when after a hunting movement a block number is tested and it is found to be too high, then the hunting movement will be started again in the conventional manner. However, in this instance the block number identification signal code before the number just tested instead of causing stoppage of the tape transmitter will cause the operation of an over-riding relay which will close a substitute path for maintaining the movement of the tape after the usual response has been made to such a code. This over-riding relay will then allow the circuit to be set for another response to such a signal but will itself remain operated so as not to interfere with such other response.

The circuit may be likened to a trigger mechanism which must be latched into operating position. The encounter with a stop signal code triggers the circuit and brings the code carrying tape to a stop. When the tape is to be moved in a reverse direction however, the first trigger action is rendered ineffective and there is an automatic relatching operation preparatory to another and later trigger action which becomes normally effective.

The drawings consist of sixteen sheets having eighteen figures as follows:

Figs. 1 and 2 taken together with Fig. 1 placed above Fig. 2 form a combination schematic circuit diagram and a flow chart which will show the general organization of the device in which the present invention is employed and will indicate the direction of movement of the signals controlling the electrical operations thereof;

Fig. 4 is a block diagram showing how Figs. 5 to 14, inclusive, may be placed to provide a schematic circuit diagram to explain the action of the three-digit adder used to control the movement of the interpolator and ballistic tapes, in which:

Fig. 5 shows the circuits of the problem data tape transmitter which controls the setting of the three-digit adder to a three-digit block number which must be matched from another tape such as the interpolator tape;

Fig. 14 shows the augend (A) portion of the third or W order of the said three-digit adder;

Fig. 15 is a block diagram showing how Figs. 16 to 18, inclusive, may be placed to form a complete shorthand schematic diagram of the calculating circuits of the three-digit adder;

Fig. 16 shows the circuits which may be traced through the contacts of the relays of the U or hundreds order of the three-digit adder;

Fig. 17 shows the circuits which may be traced through the contacts of the V or tens order of the three-digit adder.

This application is one of a group of seven applications all based on the same arrangement. The Andrews-Vibbard application is a full and complete disclosure and includes a disclosure of the present invention, the other applications including the present application being abbreviated disclosures of certain features of the complete device as follows:

| Applicant | Serial Number | Filing Date | Subject |
|---|---|---|---|
| Andrews-Vibbard | 716,680 | December 17, 1946 | Automatic Calculator. |
| Vibbard | 716,827 | do | Contro Circuit, Patent No. 2,671,611, granted March 9, 1954. |
| Juley | 716,793 | do | Switching Control Ssystem, Patent No. 2,666,578, granted January 19, 1954. |
| Cesareo | 716,753 | do | Automatic Code Translating System, Patent No. 2,625,328, granted January 13, 1953. |
| Andrews | 716,762 | do | Calculator Sign Control Circuit, Patent No. 2,679,977, granted June 1, 1954. |
| Cesareo | 716,754 | do | Automatic Calculator. |

The device in which the present invention is incorporated is a calculator operated by electrical circuit change in which each new circuit operation is dependent upon the successful completion of a previous operation. It consists essentially of a calculating arrangement, a plurality of tape transmitters of the kind commonly used in printing telegraph operation for entering both operational orders and mathematical information, a plurality of registers in which the mathematical information from the tapes or calculated by the calculator may be stored temporarily and a printing device also of the type commonly used in the printing telegraph art for recording various items of information, including the arguments of the problems, partial results and the final solutions.

Figure 1:
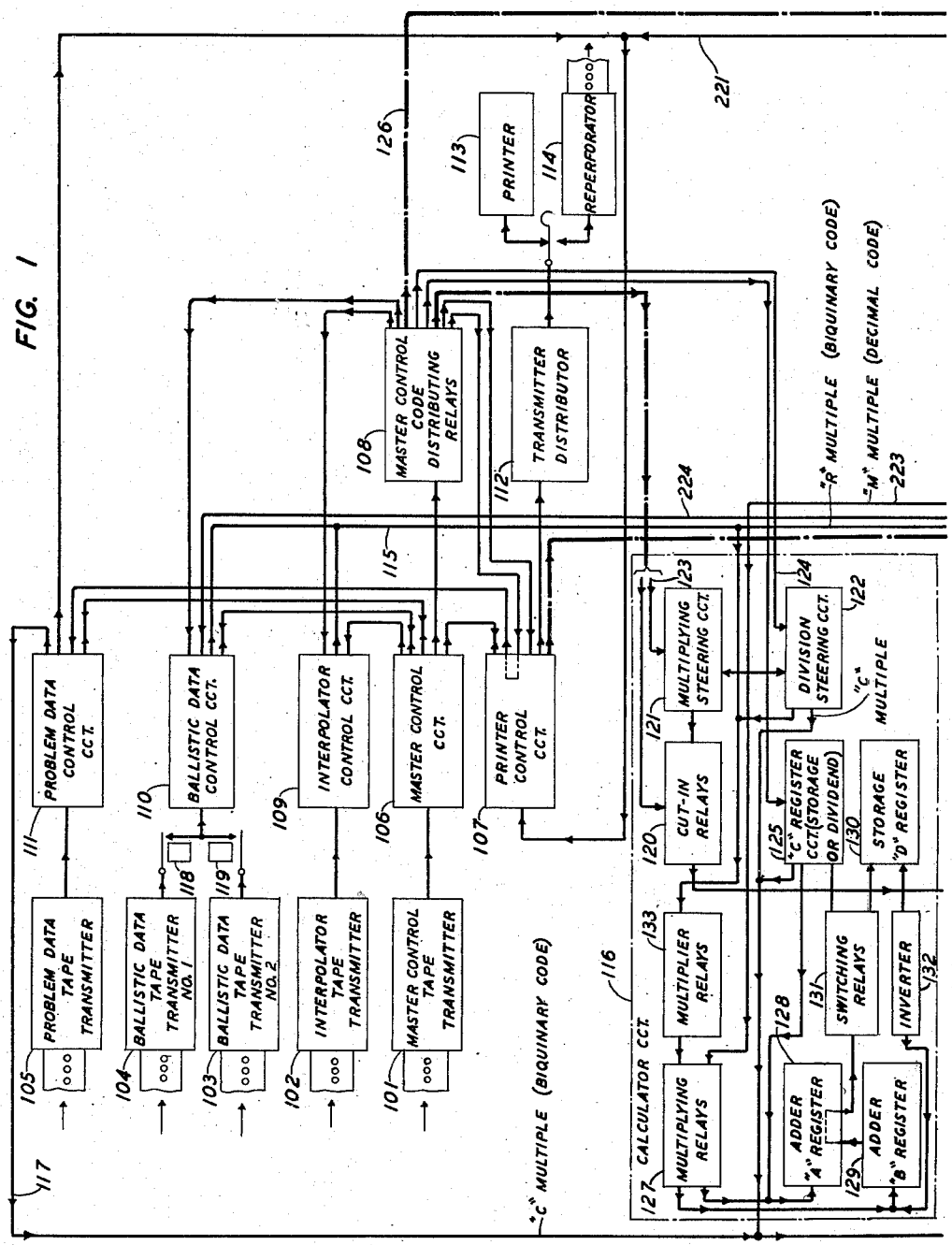

In Fig. 1 there is shown a master control tape transmitter 101 which is used to transmit operational orders from a so-called routine tape into the master control circuit 106, which has general control over all the operations of the device. Other similar transmitters are the interpolator tape transmitter 102, the ballistic data tape transmitters 103 and 104 and the problem data tape transmitter 105, each with its control circuit. All of these transmit mathematical information from appropriate tapes and all of this information is generically problem data. That provided by the problem data tape constitutes the arguments of the problem, that from the interpolator tape constitutes correlated or empirical data and that from the ballistic tapes constitutes table information or precalculated data such as is usually found in the so-called tables of functions such as trigonometric, logarithmic, ballistic and other such data. In the operation of this device the routine tape is operated cyclically, that is it runs through its transmitter over one complete set of routine orders necessary for the calculation of a function from one given argument or set of arguments. The problem data tape usually contains a series of arguments and is moved forwardly step by step under control of the master control circuit, the master tape operating through one cycle for each argument. The remaining tapes contain necessary information and may be moved from point to point either forwardly or backwardly to transmit information called for by the master control from time to time during the calculating operations.

Figure 2:
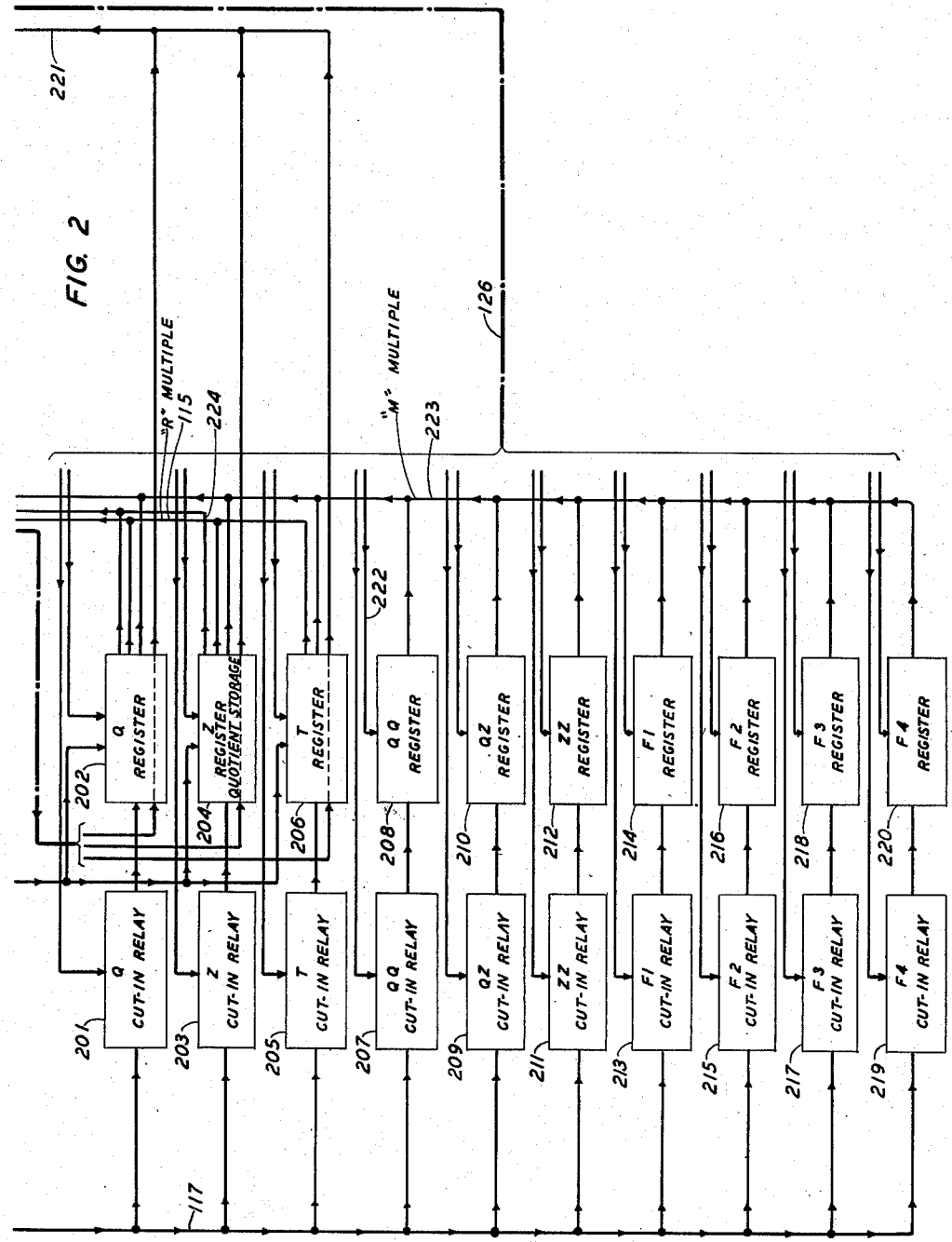

The calculator here generally shown as included in the broken line rectangular 116, consists primarily of four relay registers, the A register 128 constituting an augend element, the B register 129 constituting an addend element and the C register 125 and D register 130 being used alternatively as sum elements. All problems presented to the calculator are in the form of problems in multiplication and the calculation is actually performed by summing the values registered at various times in the A and B registers. For this purpose a set of multiplying relays 127 and a set of multiplier relays 133 are provided, by means of which a multiplicand operating the multiplying relays 127 may be multiplied by one digit at a time of the multiplier which operates the multiplier relays 133. There is provided a set of switching relays 131 for determining into which register the C register 125 or the D register 130 the values in the A and B registers shall be summed. Values stored in the D register 130 may be transferred only to the B register 129 by way of an inverter 132. This is a means by which the value being transferred from the D register to the B register may be transferred as it is or in its complemental form. Values stored in the C register 125 may be transferred either to the A register or transmitted out over the C multiple 117 for transfer to any one of the various registers shown in Fig. 2.

The calculator 116 is under general control of a steering circuit 121 which controls the various steps in a multiplying calculation cycle. When a problem in division is presented, an additional circuit, the division steering circuit 122 is brought into action to make the necessary changes and alterations in the calculating cycle. The cut-in relays 120 ordered into operation by the master control circuit 106 through the code distributing relays 108 operate to activate one decimal denominational order at a time of certain registers which then transmit over the R multiple 115 to operate the multiplier relays under control of the steering circuit 121. The division steering circuit, ordered into operation over the path 124, besides modifying the calculation cycle provides a supply of multiplier digits over the R multiple 115 to the multiplier relays 133 as trial quotient digits and transmits the correctly calculated quotient digits over the C multiple 117.

The steering circuit essentially constitutes the means for controlling the pattern of operations throughout the calculation cycle. Since in problems in multiplication this cycle is straight-forward the steering circuit comprises a string of relays which operate in sequence starting from any given selected point and ending at any given selected point, there being in this embodiment three relays for each cycle and as many groups of three as there will be cycles or shifts in columnar arrangement. In a problem in division it is not possible to select the true quotient digit without trial and hence if a certain digit is tried and found to be unsatisfactory the otherwise orderly sequence in the operation of the steering relays must be interrupted and the chain recycled. That is after such an unsatisfactory trial the steering chain must be reentered and another trial made. Hence the division steering circuit 122 is shown as a separate entity but one which operates in conjunction with the multiplying circuit 121. Actually it operates in addition to the principal circuit 121.

In making calculations by the device of the present invention the arguments of the problem are recorded in the problem data tape in groups or blocks, each group or block containing complete information for the calculation of one point on a curve or one set of corresponding points on a related set of curves under one complete cycle of operations of the routine or master tape. Certain empirical or correlated information is recorded on another problem data tape in similar blocks and the blocks in each of these tapes are similarly numbered. In the present embodiment of the invention three-digit block numbers are employed so that the so-called problem data tape containing the arguments of the problem and the so-called interpolator tape containing correlated information are similar in make up, each containing a plurality of blocks of mathematical information serially numbered with the block numbers recorded in these tapes each before the corresponding block of information. In other problem data tapes, herein specifically called ballistic tapes, but generically known as table tapes, the information is also recorded in blocks, each block preceded by a block number and these block numbers being in serial order. The block numbers in the table tapes bear no particular relation to the block numbers in the argument tape but do bear a relation to the arguments recorded therein in that during the calculation the block numbers in the table tapes are derived by calculation in which the arguments are factors.

The device of the present invention is a means for determining when a given tape has been moved to a wanted block of information. Broadly stated, the wanted block number is entered in a three-digit adder and the tape containing the wanted information is moved until a block number is encountered, whereupon a test of such block number is made by calculation. That is, the complement of such encountered block number is also entered in this three-digit adder and the two values are summed. If a zero is produced as a sum in each of the three decimal denominational orders of the three-digit adder, then it is known that the numbers correspond and that the wanted block number has been found. If anything other than a zero is produced as the sum in any one or more of the three orders of the adder, then it is known that the wanted block number has not been found. In such a case the value of the carry out from the highest decimal denominational order of the three-digit adder is examined to determine whether the hunt for the wanted block number is to be resumed in a forward direction because the number found is too low in value or to be made in a rearward direction because the number found is too high in value.

In Fig. 1 the three-digit adder used for the control of the interpolator tape transmitter 102 is part of the interpolator control circuit 109. A similar three-digit adder incorporated in and forming a part of the ballistic data control circuit 110 is used to control both the ballistic data tape transmitter No. 1 here designated 104 and the ballistic data tape transmitter No. 2 here designated 103. It has been found expedient here to use separate three-digit adders in each of these control circuits since the saving in time in hunting justifies this expense. It is contemplated however, that a single adder of this nature may be used in common by a plurality of transmitter control circuits, as indeed such an arrangement is shown where the adder in the ballistic data control circuit 110 is used in common by the two ballistic transmitters 103 and 104.

In the following description, the operation of the three-digit adder in the capacity of a testing device is set forth in detail.

Figure 3:
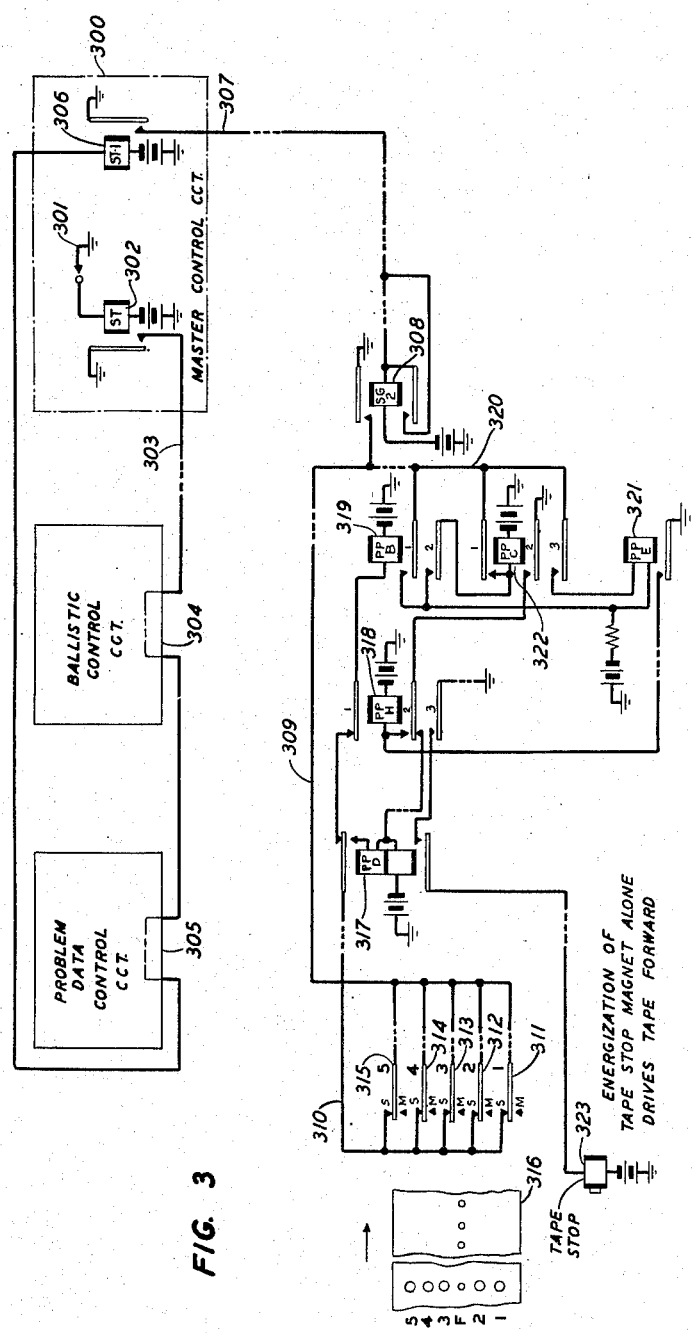
Fig. 3 is a schematic circuit diagram showing how one of the problem data tapes used to supply information called for by routine orders, such as the interpolator or one of the ballistic tapes, may be run at high speed from block to block and then brought to a stop when a warning signal is encountered.

Fig. 3 is a schematic circuit diagram showing certain details of the interpolator control circuit and shows the manner in which the interpolator or any other tape containing precalculated or known information is moved at high speed until a warning signal is received to the effect that the next three codes (in a forward direction) constitute a block number. For this purpose a five hole code constitutes a data point symbol and it is immaterial whether the tape is moving forwardly or backwardly, since the effect is to stop such high speed movement (in either direction) and to start a slow speed step-by-step movement in a forward or normal direction during which the block number is read off by the tape transmitter and put into the augend (A) portion of the adder.

In Fig. 3 the broken line rectangle 300 represents the master control circuit. When in this circuit a ground 301 is connected to the start relay 302, this relay places a ground on a lead 303 which extends through the ballistic control circuit 304 and the problem data control circuit 305 back to the master control circuit 300 where, if conditions in the ballistic control circuit and the problem data control circuit are in proper order the ST-1 relay 306 will be operated. Relay 306 places ground on conductor 307 extending into the interpolator control circuit (the main portion of the circuits of this figure are in the interpolator control circuit) where it operates the SG2 relay 308. Relay 308 locks to this conductor 307 about certain points not shown here but indicated by the dotted portion thereof. Relay 308 now grounds conductor 309 thus placing ground in parallel on each of the five fingers 311 to 315 of the interpolator tape transmitter. Each of these fingers normally rests on its spacing (or upper) contact so that ground will be extended to conductor 310 and held there until a five-hole code in the tape 316 is encountered. No other code will remove ground from conductor 310. The ground extended to conductor 310 will be extended over the upper armature and back contact of PPD relay 317, the back contact and armature 1 of PPH relay 318 and the winding of PPB relay 319 to battery. Relay 319 operates and extends ground from the upper armature of relay 308, conductor 320, armature 1 and front contact of relay 319, to the lower terminal of PPE relay 321. The ground on conductor 320 is also extended through armatures 1 and 2 and their front contacts to the winding of PPC relay 322, which now operates and locks directly to conductor 320. Relay 322 extends the ground on conductor 320 to the upper terminal of relay 321, so that when relay 319 releases this relay 321 will operate. Relay 322 also extends ground through armature 2 and back contact of relay 319 to the windings of PPD relay 317 which thereupon operates through its lower winding and locks to conductor 310 through its upper winding. Relay 317 operates and opens the circuit for relay 319 which thereupon removes ground from the lower terminal of relay 321, thus allowing relay 321 to operate. Relay 321 now causes the operation of PPH relay 318 and this relay locks to a ground supplied by the PPC relay 322. The interaction of these relays now closes a circuit from ground, armature 3 and front contact of PPH relay 318, lower armature and front contact of PPD relay 317 to the winding of the tape stop magnet 323. This magnet allows the clutch of the tape transmitter to engage and drive the tape forward at high speed, that is, continuously and without interruption. It may be noted here as it will appear in more detail hereinafter that the reversible transmitters are provided with a reversing magnet. When the tape stop magnet alone is energized the tape will move forwardly and when the reversing magnet is simultaneously energized, then the tape will move backwardly. Since it is immaterial for the present purposes to describe the tape as moving in either particular direction only the tape stop magnet is shown. Now as the tape starts to move the various fingers of the transmitter will move at times away from their back or spacing contacts but the circuits now described as having been established will be maintained until a five-hole code is found. At this time and only at this time will the holding circuit for relay 317 be opened and as a result the circuit for the tape stop magnet will be opened, to stop further movement of the tape. Thus when the tapes are to be synchronized or one of the table tapes is to be run to a particular block number the first action is to run such tape to the first available block number in the manner described. Further action may now be followed by reference to the schematic of the three-digit adder.

THE THREE-DIGIT ADDER

Testing by calculation

Figure 4:
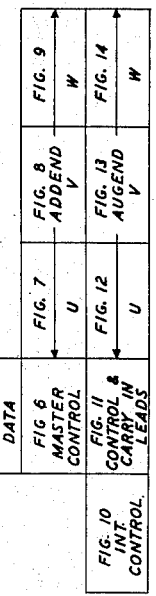

Figs. 5 to 14 arranged as shown in the block diagram Fig. 4 provides a schematic circuit diagram to explain the manner in which testing may be done by calculation. A table tape, such as the interpolator tape has to be moved to such a point that given information may be read from it. This given point is marked by a block number which in the present disclosure is a three-digit number. Hence means are required to test the tape as it moves to determine when the given point has been reached. Therefore as the tape moves and brings in a block number this number is compared with a number designated by the problem data or argument tape and as a result of this test the tape is either halted, moved forwardly or moved backwardly. Thus the test by calculation results in an indication that the tape which is being moved has been moved to the proper place, that it has been moved to a point beyond that desired, or that it has been moved to a point short of that desired. The manner in which this is accomplished will now be described, using the movement of the interpolator tape by way of example.

Let it be assumed that the master control tape has been recycled, either after the successful calculation of the functions related to the arguments recorded under block number 185 in the problem data tape or otherwise and that the problem data tape has been moved to the point where it is ready to designate the next block number 186 as the next control. The master control tape will move forwardly over a number of five-hole codes whereby each of the five transmitter fingers 601 to 605, inclusive is driven to its marking contact until a blank space in the tape is encountered. Then in a manner fully explained hereinafter the ST relay 606 will be operated and will cause the operation of the companion ST-1 relay 607 when it is assumed that the other transmitter control circuits are in order. Thus the ST relay 606 closes a ground from its armature 1 to conductor 608 which leads through a down check circuit of the relays in the problem data control circuit consisting of an armature and back contact in series of each of relays 511 to 515, inclusive (responsive to marking grounds on the transmitter fingers 501 to 505, respectively) to the ground delay relay 506. Relay 506 operates relay 507 and relay 507 in turn operates relay 508 providing, of course, this down check circuit is closed, thus giving assurance that the problem data transmitter is in order. Upon the operation of relay 508 a ground on armature 2 of ST relay 606 is extended over conductor 609, through check circuits in the interpolator control circuit and the ballistic control circuit, the armature and contact of relay 508, conductor 509 to the winding of ST-1 relay 607. Relay 607 operates (and locks to the operated ST relay 606) and through its armature 1 places a ground on conductor 610 leading to the mark bar of the problem data transmitter so that wherever one of the fingers 501 to 505 encounters a hole it will extend this ground to the corresponding relay to cause the code encountered to be translated to the biquinary code for transmission to any desired point. In a manner to be more fully described hereinafter the problem data transmitter will be set at a five-hole code (assuming this operation to be the start of a new cycle of calculations) or will be synchronized to such a point. This is known as an ER signal and will result in grounding conductor 510 to operate the ER relay 801 which operates ER-1 relay 802 and which in turn operates T relay 803. This latter relay will prepare the chain start ground circuit of the three-digit adder steering circuit.

Now in the typical example set forth at length in the Andrews-Vibbard application it will be noted that operation No. 1 is designated as a priming operation. This takes place while the five fingers of the master tape transmitter encounter the blank code as set forth. When it is determined that the apparatus is all ready to function the master tape will be advanced and ground from armature 4 of relay 607 will be supplied to the marking contacts of this master tape transmitter so that the codes can be properly read off. In accordance with the typical example the next master code will be 88 for operation No. 2 which will result in the class 1 relays being operated. This we may pass over with the simple observation that when these relays are properly operated a ground will be returned to the STP magnet 611 to advance to the next operation. The operational order now issued (operation No. 3) will be that designated by master code 05 by which the lead PD-TQZ is grounded. This is shown here schematically as lead 612 which will result in the grounding of two leads T-MCA and T-MCB whereby the TC relay 701 is energized to connect the T register to the C multiple so that the U, V and W orders of the T register may be set from codes read off the problem data tape. These codes will be 186, the time of burst given by way of example hereinbefore. The operation of the cut-in relay 701 will supply a ground to the front contact and upper armature of relay 803, the chain start ground wire 804, the continuity contacts of W relay 901, continuity contacts of the V relay 805, lower armature and front contact of relay 803, the winding of U relay 702 to battery, resulting in the energization of this relay and its companion U1 relay 703, whereby the U order of the C multiple is connected through from the translator 516 to the U order of the T register. When the U order of the T register is properly set the step magnet 517 of the problem data transmitter will be energized to step the tape along. At the same time a link in the circuit from ground, armature 2 and front contact of relay 607, conductor 613 will be closed to relay 704. This will extend a ground over armature 4 of relay 702, the armature and front contact of relay 704 to relay 706, which will extend the chain start ground to the winding of the V relay 805 and cause its operation and the operation of its companion V1 relay 806, thus connecting the V order of the C multiple through from the translator 516 to the V order of the T register.

When the three digits have been put in the T register and the five digits in each of the Q and Z registers as called for by the code lead PD-TQZ the master tape transmitter will be stepped along in the usual manner. These operations, of course, are preliminary to the operation of the three-digit adder. In accordance with the description hereinbefore the value of time 186, now registered is used for calculation and a new time 183.195 is calculated and stored in the T register, the value 186.000 being released.

Now when it is desired to find out what the gun orders were at time 183.195 the values 183 in the U, V and W orders of the T register are used to set the B register of the three-digit adder so that the gun orders recorded in time blocks 182, 183, 184 and 185 in the interpolator tape may be used to interpolate to the fractional component .195. While in this schematic intended to show the operation and use of the three-digit adder, the problem data tape transmitter and the means for transferring mathematical information from the problem data tape to the registers is shown, it is to be understood that use of the three-digit adder is not part of such transferring operation in the method by which the device is used for the typical example. The block number (183) which controls the hunting in the interpolator tape is in the T register when the three-digit adder is to be used but the manner in which the T register is set from the tape is also shown for the sake of clarity.

In the typical example, operation No. 36 (master code 01) is the operational order issued by the master tape which starts the first hunting operation of the interpolator tape. This, as indicated in Fig. 6, will ground the two leads ID-A lead 614 and ID-B lead 615.

Ground on the ID-A lead 614 will be extended over armature 2 and back contact of the PPW relay 707 to the winding of PPU relay 708, causing the operation of this latter relay 708. Ground on conductor 614 is now extended through armature 3 and front contact of relay 708, thence through the down check circuit of the B relays of the three-digit adder here indicated by the dotted portion 705 of this conductor to the winding of the CT relay 710. Relay 710 locks through its armature 4 directly to the ground on conductor 614 and extends this ground over armature 1 and front contact of relay 708 and armatures 1 and 2 of relay 710 to the activate leads of the T register (note conductors 711, 712, 807, 808, 903 and 904). The B relays of the three-digit adder will thus be set in accordance with the value 183 now assumed to be registered in the U, V and W orders of the T register. Ground on armature 5 of relay 710 is now extended to conductor 713 which acts to lock the operated B relays, such for example, as UB-00 relay 714. Ground on armature 3 of CT relay 710 is now extended over the upcheck circuit of these relays beginning with conductor 715 and extending through to conductor 905 which operates the PPW relay 707. The operation of relay 707, releases relay 708, whereupon the ID-B lead is extended through armature 4 and back contact of relay 708, front contact and armature 1 of relay 707, conductor 716 to the lower winding of relay 1101. Thus relay 1101 operates when it is assured that the B relays of the three-digit adder have been properly set to the designated block number.

Figure 6:
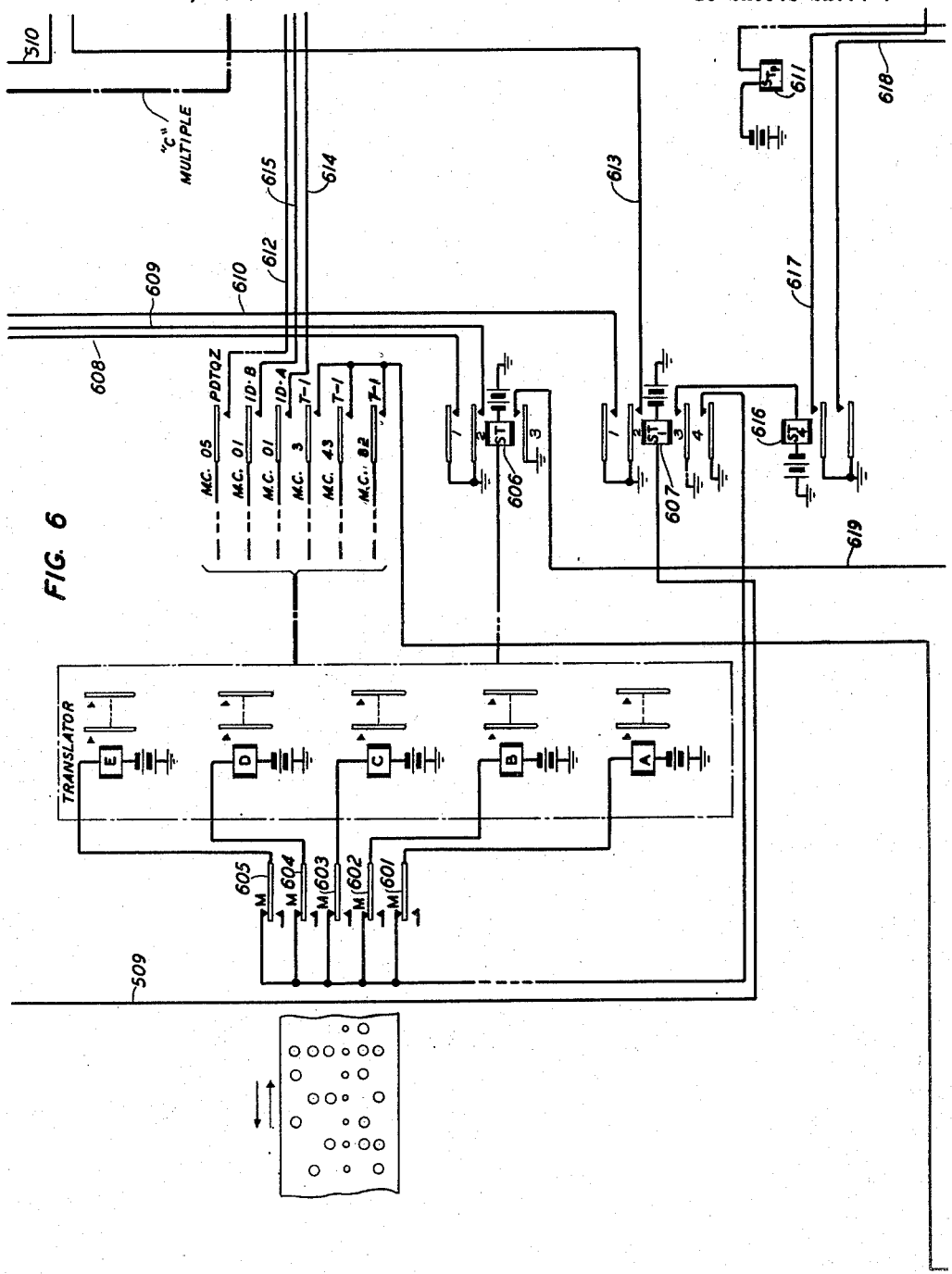
Fig. 6 shows similar circuits for the master control circuit from which routine operational orders are issued.
Figure 7:
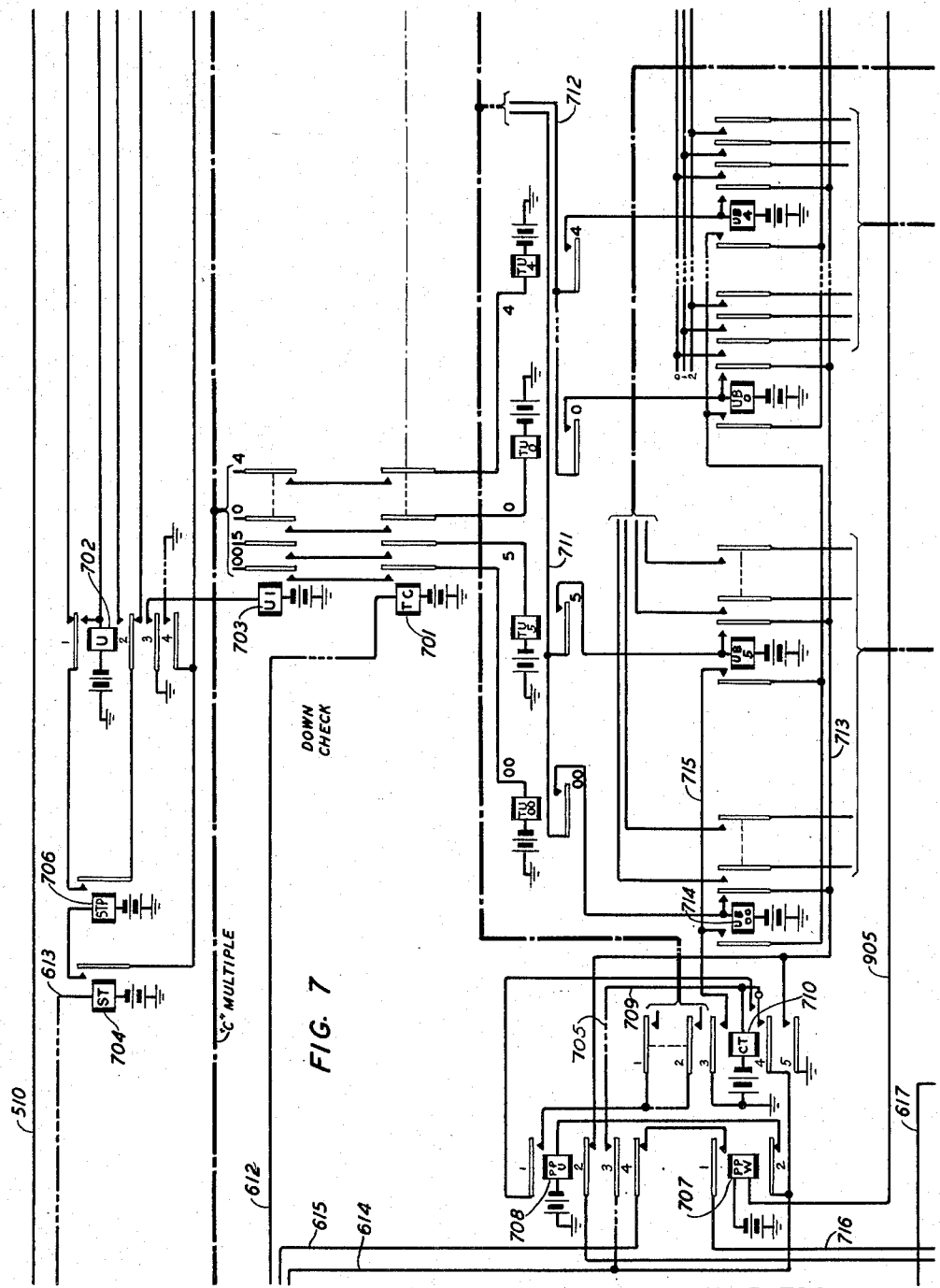
Fig. 7 shows the addend (B) portion of the first or U order of the said three-digit adder.
Figure 8:
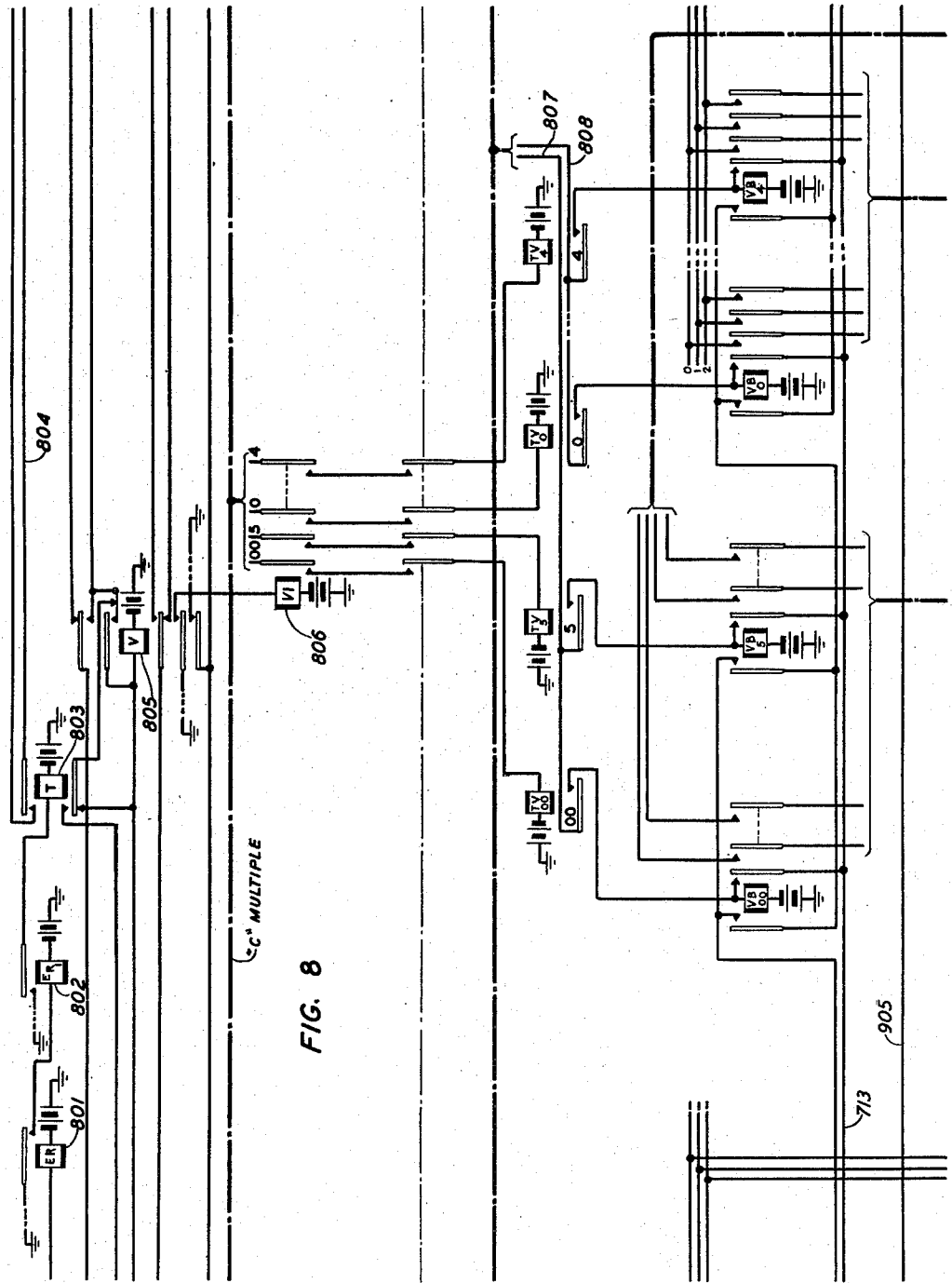
Fig. 8 shows the addend (B) portion of the second or V order of the said three-digit adder.
Figure 9:
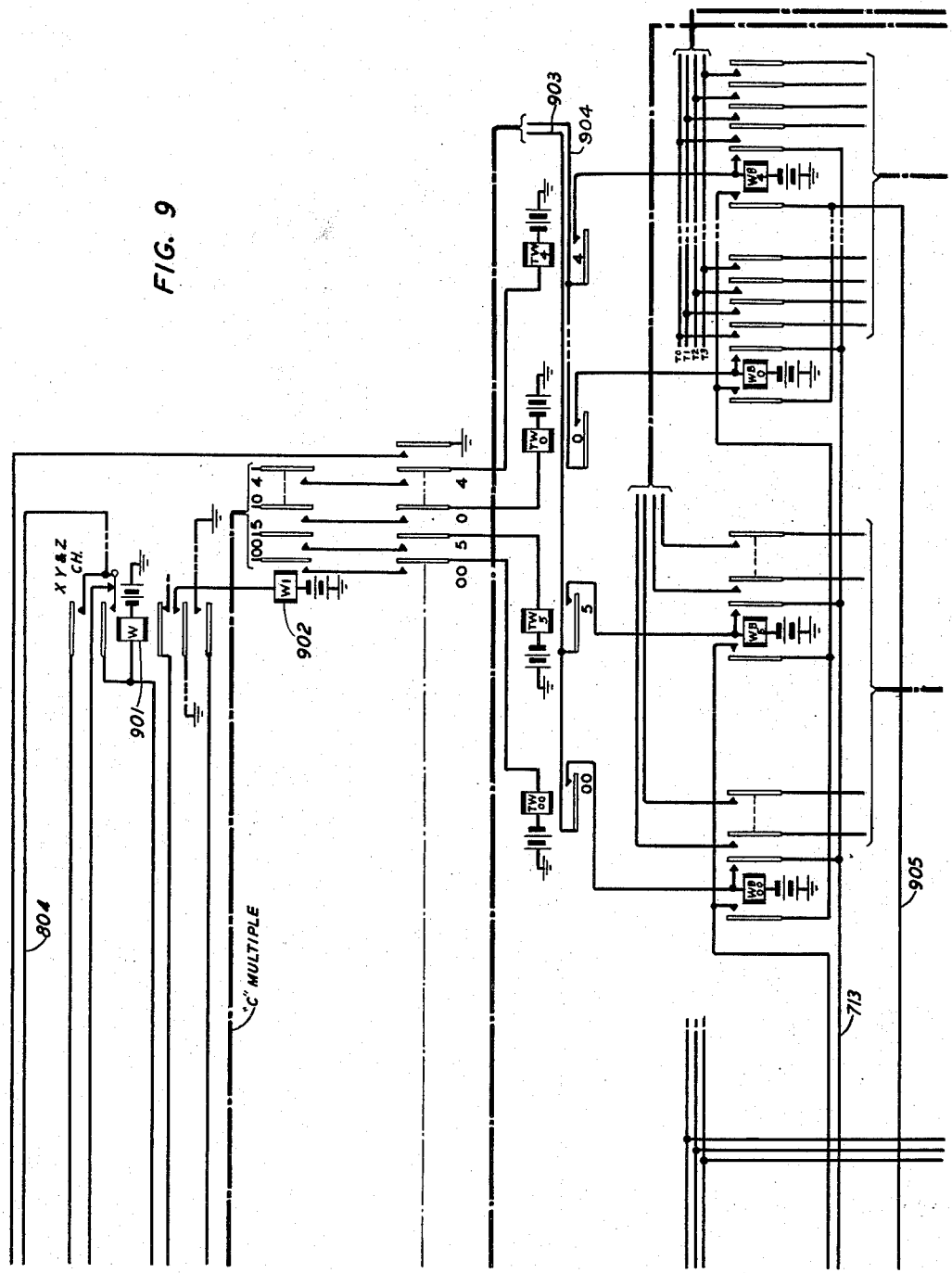
Fig. 9 shows the addend (B) portion of the third or W order of the said three-digit adder.
Figure 10:
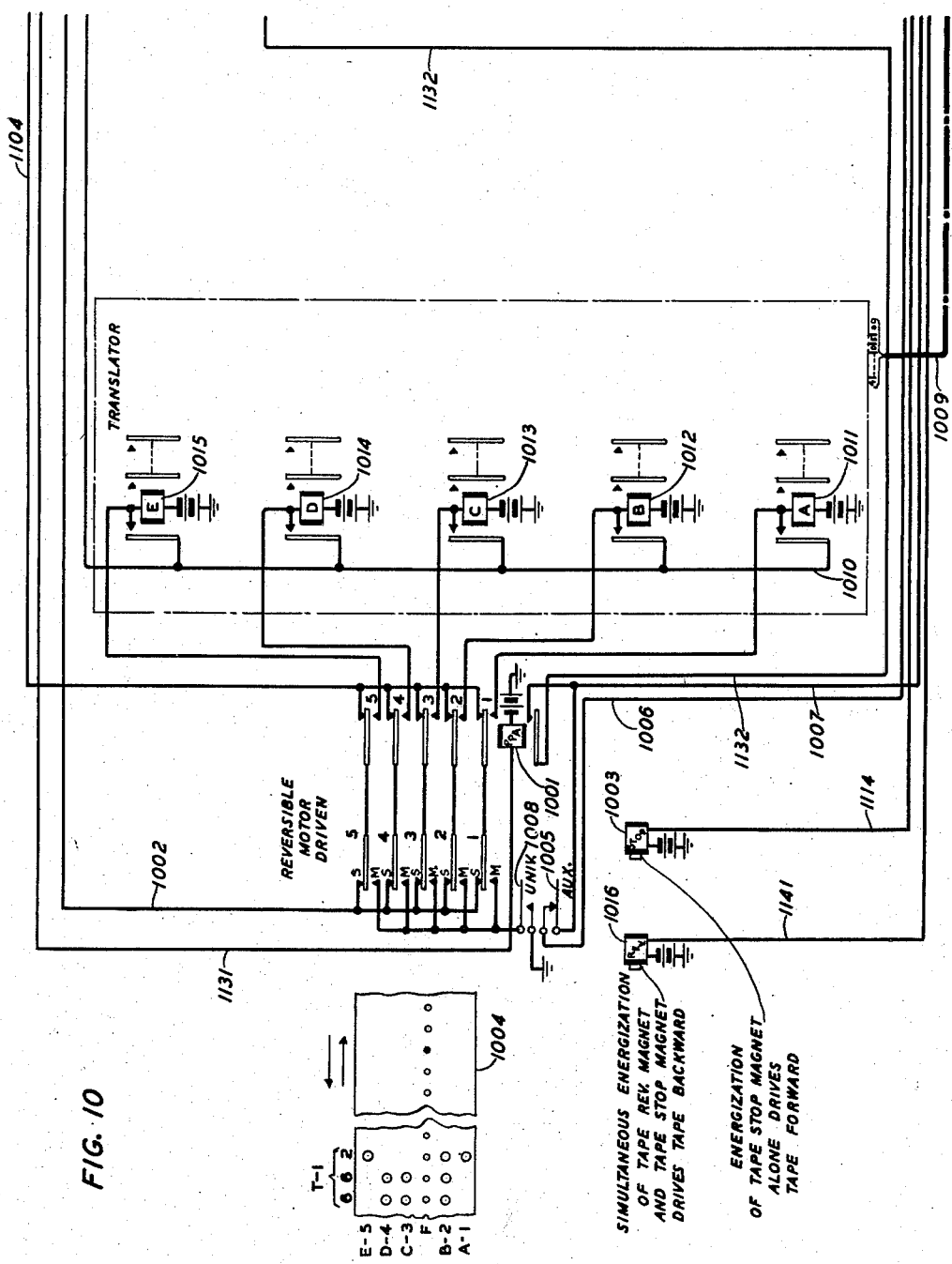
Fig. 10 shows the circuits of the interpolator tape transmitter which must be run either forwardly or backwardly at high speed until a block number is found which will match the block number set up on the addend elements of the three-digit adder from the problem data or argument tape.
Figure 11:
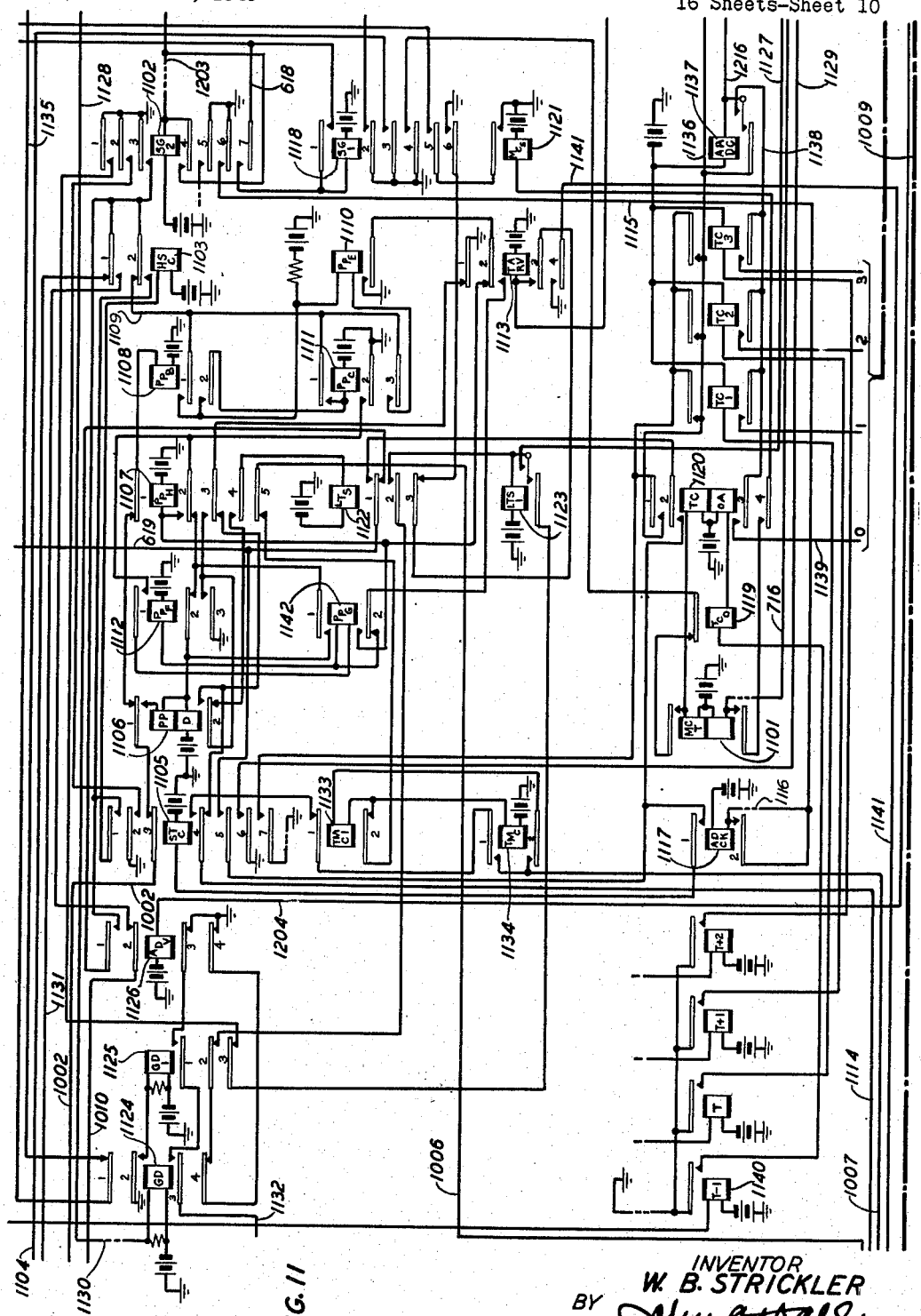
Fig. 11 is a control circuit by which the various carry in leads to the three-digit adder may be controlled so that the block number in the interpolator tape will bear a selected relation to the block number designated by the problem data tape.
Figure 12:
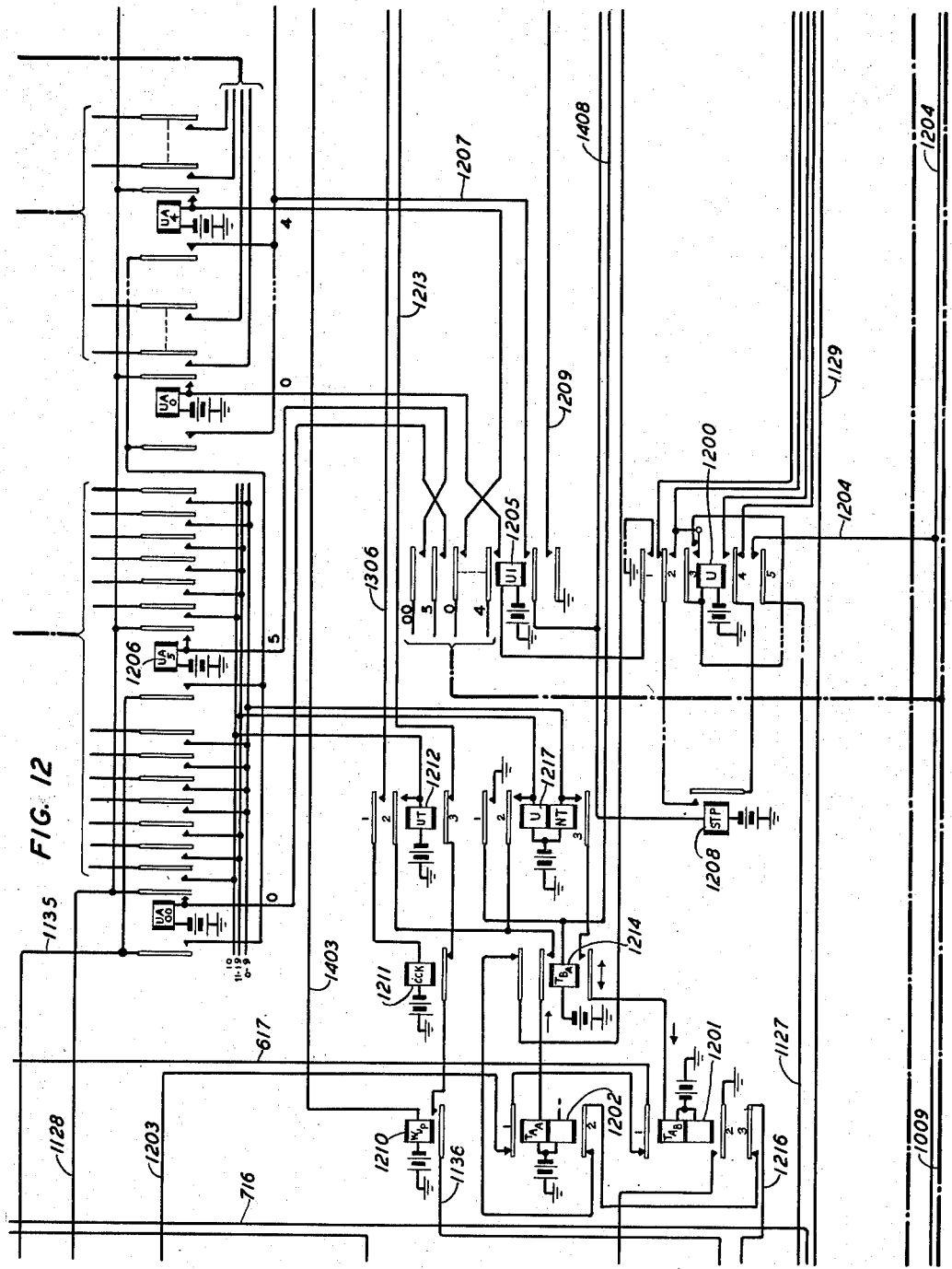
Fig. 12 shows the augend (A) portion of the first or U order of the said three-digit adder.
Figure 13:
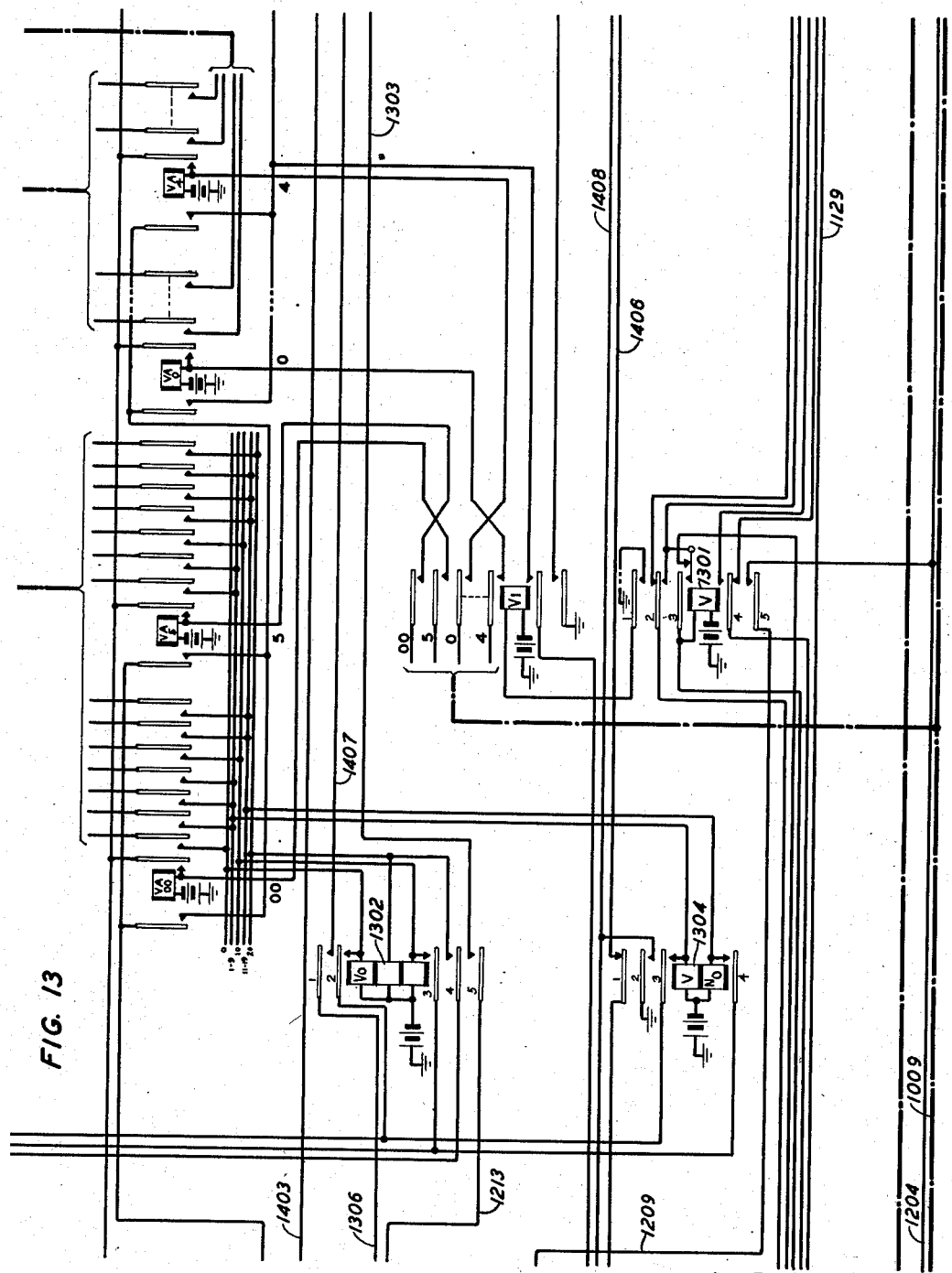
Fig. 13 shows the augend (A) portion of the second or V order of the said three-digit adder.

In the meantime an operation similar to that described under Fig. 6 has taken place. The operation of ST-1 relay 607 results in the operation of ST-4 relay 616, whereupon a ground is extended over conductor 617, armature 1 and back contact of TAB relay 1201, armature 1 and back contact of TAA relay 1202, conductor 1203 to the winding of SG-2 relay 1102. This relay extends a ground from its armature 3 and front contact over armature 1 and back contact of HSC relay 1103, conductor 1104 over the back contact and any one or more of the armatures of PPA relay 1001 to the corresponding transmitter fingers and the corresponding spacing contact conductor 1002, armature 3 and back contact of STC relay 1105, armature 1 and back contact of PPD relay 1106, back contact and armature 1 of PPH relay 1107 through the winding of PPB relay 1108 to battery. Relay 1108 operates and extends the ground from armature 3 of relay 1102 through armature 2 and back contact of HSC relay 1103, conductor 1109, armature 1 and front contact of relay 1108, to the upper terminal of PPE relay 1110 and in parallel therewith through the front contact and armature 2 of relay 1108 through the winding of PPC relay 1111. Relay 1110 is prevented from operating until relay 1108 releases but relay 1111 operates and locks directly to conductor 1109, at the same time closing ground to the lower terminal of relay 1110. Relay 1111 now extends ground from its armature 2 and front contact through armature 2 and back contact of PPH relay 1107, back contact and armature 2 of PPF relay 1112, through the lower winding of PPD relay 1106 to battery. Relay 1106, operates, locks through its armature 1 directly to the ground from conductor 1002 and cuts off PPB relay 1108. Relay 1108 releases and by removing ground from the lower terminal of relay 1110 allows this relay to operate. Relay 1110 closes a circuit through from ground, its armature and front contact, armature 2 and back contact of TA-RV relay 1113, the winding of PPH relay 1107 to battery. Relay 1107 locks to the ground for the original energization of relay 1106 and opens this original energizing circuit. With relays 1106 and 1107 operated a circuit is established from ground, the back contact and armature 1 of TA-RV relay 1113, front contact and armature 3 of PPH relay 1107, armature 2 and front contact of relay 1106, back contact and armature 4 of STC relay 1105, conductor 1114 through the winding of tape stop magnet 1003 to battery. The magnet 1003 will cause the interpolator tape 1004 to move forwardly (toward the right, as shown) continuously until a five-hole code is encountered whereupon the ground will be removed from conductor 1002, allowing PPD relay 1106 to release and to open the circuit for this stop magnet 1003. Relays 1107, 1111 and 1110 remain operated under control of SG-2 relay 1102.

Relay 1102 also closes a circuit from ground armature 6 and front contact of relay 1102, conductor 1115 through a down check circuit of the A relays of the three-digit adder here indicated by the dotted portion 1116 of the conductor 1115, through the advance check AD-CK relay 1117 to battery, so that this relay is operated and ready to advance the circuit operation if the A relays are fully released. (If they are not this will hold up the following circuit operations and the master control circuit will time out and bring in an alarm.)

Relay 1102 also causes the operation of the SG-1 relay 1118 from the ST-4 relay 616 over lead 618 and relay 1118 in operating locks to conductor 618 independently of relay 1102.

The operation of relay 1118 establishes a circuit from ground armature 4 and front contact of relay 1118, armature and back contact of TCO relay 1119, upper armature and front contact of relay 1101, where it branches to lock relay 1101 through its upper winding and to operate TCOA relay 1120 through its upper winding. The ground which originally operated relay 1101 is now extended over the front contact and lower armature of relay 1101, front contact and armature 4 of relay 1120, to the winding of MCS relay 1121. This master control step relay 1121 extends a ground over armature 5 and front contact of relay 1118 to the master control step magnet 611 as a signal that the hunting of the interpolator has been successfully completed and that the interpolator tape has been moved to a point where a block number may be read off.

At this point it may be noted that the interpolator control circuit will be left to automatically hunt for a block number one less in value than the block number now recorded in the B relays of the three-digit adder. This automatic action will be carried out independent (from this point on) of the master control circuit, which now proceeds to other matters. It is to be noted that the operations just described were in consequence of the routine order operation number 36 and that the information in the interpolator tape will not be used until operation number 76. Therefore the interpolator transmitter is given the time during which the master control circuit is issuing orders for operations 37 to 76, inclusive to find block number 182. (It was assumed that the B relays of the three-digit adder were set to the block number 183.)

Since nine's complements are used in this calculation a lead which will effectively carry in 0 to the three-digit adder will be used since the nine's complement 817 of the block number 182 is to be added to the number 183 to produce the desired result. In practice this hunt will end successfully in ample time before the master tape transmitter issues its master code order 03 (operation 76) so that the interpolator tape is all ready to read off the required mathematical information.

Upon the finding of the five-hole code in the interpolator tape 1004, the PPD relay 1106 releases as described. This results in the establishment of a circuit from ground, back contact and armature 1 of TA-RV relay 1113, front contact and armature 3 of PPH relay 1107, armature 2 and back contact of PPD relay 1106, armature 4 and front contact of PPH relay 1107, winding of LTS relay 1122 to battery (LTS for letters—the five-hole code in printing telegraph practice). Relay 1122 operates and closes a circuit from ground, armature 3 and front contact of ST relay 606, conductor 619, armature 1 and front contact of LTS relay 1122, armature 2 and front contact of TCO-A relay 1120, front contact and armature 1 of AD-CK relay 1117, through the winding of STC relay 1105 to battery, resulting in the operation of this relay and its locking to the start ground through its armature 5 independent of the relays 1120 and 1122.

Through its armature 2 and front contact, relay 1122 causes the operation of LTS-1 relay 1123. The operation of LTS relay 1122 by releasing the GD relay 1124, closes a circuit from ground, armature 4 and back contact of ADV relay 1126, armature 4 and back contact of GD relay 1124, armature 2 and back contact of GD-1 relay 1125, armature 2 and front contact of LTS relay 1122, the winding of LTS-1 relay 1123 to battery. Relay 1123 operates and locks in a circuit from ground, armature 2 and front contact of SG-2 relay 1102, armature 3 and back contact of GD-1 relay 1125, armature 1 and front contact of LTS-1 relay 1123. Relay 1123 places a ground on conductor 1127 for purposes which will appear presently.

The STC relay 1105 starts the calculating operation in the three-digit adder. At its armature 2 and front contact relay STC places ground on conductor 1128 for locking the A relays of the three-digit adder when they are operated. At its armature 6 and front contact relay 1105 supplies a chain start ground to conductor 1129 which may be traced through Figs. 12, 13 and 14 and then back to the winding of the U relay 1200 in order to read the first digit of the block number off the interpolator tape into the UA relays of the three-digit adder.

Now the ADV relay is operated in a circuit from ground on conductor 1127, armature 5 and front contact of U relay 1200, conductor 1204, winding of ADV relay 1126 to battery. As a result a circuit is established from ground armature 3 and front contact of SG-2 relay 1102, front contact and armature 1 of ADV relay 1126, front contact and armature 1 of STC relay, 1105 through the winding of HSC relay 1103 to battery. The operation of relay 1103 releases the PPC relay 1111 and the PPE relay 1110, whereupon the PPH relay 1107 releases. This results in the release of the LTS relay 1122, whereupon the circuit for the ground delay GD relay 1124 is reestablished from ground to armature 3 and front contact of ST relay 606, conductor 619, armature 1 and back contact of LTS relay 1122, the down check circuit for the translator relays 1011 to 1015 here indicated by the dotted line 1130 through the winding of GD relay 1124 to battery. Relay 1124 operates GD-1 relay 1125 which opens the holding circuit for LTS-1 relay 1123. This removes ground from conductor 1127 and hence from conductor 1204 and allows the ADV relay 1126 to release. A circuit may be traced from ground, armature 3 and front contact of SG-2 relay 1102, armature 1 and front contact of HSC relay 1103, conductor 1131, through the winding of PPA relay 1001 to battery. This results in the establishment of a circuit from ground, armature 3 and back contact of ADV relay 1126, front contact and armature 1 of GD-1 relay 1125, front contact and armature 3 of GD relay 1124, conductor 1132, armature 6 and front contact of PPA relay 1001, the auxiliary transmitter contacts 1005 normally closed while the transmitter is at rest, conductor 1006, armature 5 and back contact of PPH relay 1107, armature 2 and back contact of TMC-1 relay 1133, through the winding of TMC relay 1134 to battery. Relay 1134 operates and closes a circuit from ground on conductor 1132, armature 6 and front contact of PPA relay 1001, conductor 1007, front contact and armature 1 of TMC relay 1134, armature 1 and back contact of TMC-1 relay 1133, front contact and armature 4 of STC relay 1105, conductor 1114, through the tape stop magnet 1003. At the same time the ground on conductor 1007 is extended through the front contact and armature 2 of TMC relay 1134, to the upper terminal of TMC-1 relay 1134 so that when the ground is removed from the lower terminal thereof (upon the opening of auxiliary contacts 1005) this TMC-1 relay 1133 will operate to release the TMC relay 1134.

The operation of the tape stop magnet allows the tape to advance and bring the code for the first digit of the block number under the fingers of the transmitter. As the movement of the tape starts the auxiliary contacts 1005 are opened so that ground is removed from conductor 1006, resulting in the operation of TMC-1 relay 1133 in series with TMC relay 1134. Ground is maintained on conductor 1007 to hold these two relays operated until one or more of the translator relays 1011 to 1015 is operated (relay PPA is now operated) in response to the code whereupon the GD relay 1124 and the GD-1 relay 1125 are released. This results in the removal of ground from conductor 1132 and hence from conductor 1007, thus releasing relays 1133 and 1134.

The universal contact 1008, closed during a portion of the time the fingers of the transmitter are in contact with their marking contacts supplies ground for operating the translator relays and hence the printing telegraph code is translated into the biquinary code and transmitted out over the trunk 1009. At the other end of this trunk (in Fig. 12) the U1 relay 1205 has been operated from the steering U relay 1200, so that the code is now inverted (to register its nine's complement) and transmitted to the UA relays of the three-digit adder, such for example as the UA-5 relay 1206. When one binary and one quinary relay of this U order of the A relays of the three-digit adder have been operated, then a portion of the up-check circuit will be closed from ground, armature 3 and front contact of SG-1 relay 1118, back contact and armature 1 of GD relay 1124, conductor 1135, through the up-check circuit of the U order, conductor 1207, front contact and armature 1 of U1 relay 1205 to the STP relay 1208 to battery. This relay extends the chain start ground to armature 4 and front contact of U relay 1200 to cause the operation of the V relay 1301. The relay 1301 operates and locks to the chain start ground and this locking circuit holds the U relay 1200 until the STP relay 1208 releases. This is brought about as follows. As the transmitter completes its one-step cycle its fingers move away from their marking contacts. However, the translator relays are held operated over the locking conductor 10, which may be traced over the armature 2 and back contact of ADV relay 1126 to the front contact and armature 1 of SG-2 relay 1102. However, the U1 relay 1205 grounds conductor 1209 and this is extended through armature 5 and front contact of V relay 1301 to conductor 1204 to operate the ADV relay 1126. The operation of relay 1126 opens the up-check circuit of the A relays of the three-digit adder and this releases the STP relay 1208 to in turn release the U relay 1200.

The operations in registering the second and third digits of the block number follow the same pattern and need not be described in detail.

When the third digit has been registered, then the up-check circuit of the A relays of the three-digit register is closed through to conductor 1401, thence through a front contact and armature of W1 relay 1402, conductor 1403 to WUP relay 1210. Relay 1210 operates and establishes a circuit from ground, armature 7 and front contact of STC relay 1105, armature 1 and front contact of TCO-A relay 1120, conductor 1136, armature and front contact of WUP relay 1210, armature and back contact of CCK relay 1211, armature 3 and back contact of UT relay 1212, conductor 1213, armature 5 and back contact of V0 relay 1302, conductor 1303, armature 5 and back contact of W0 relay 1404, back contact and armature 1 of WN0 relay 1405, conductor 1406, back contact and armature 1 of VN0 relay 1304, conductor 1305, back contact and armature 1 of TBA relay 1214, back contact and armature 2 of TAA relay 1202, back contact and armature 3 of TAB relay 1201, conductor 1216, winding of relay 1137 to battery. Relay 1137 operates and locks directly to the ground on conductor 1136. Relay 1137 closes ground to conductor 1138 to provide the proper carry in to the three-digit adder. Since the hunt is for a block number one less in value than that registered in the B relays of the three-digit adder and since the nine's complement of the found block number is used without compensation a carry in 0 will be used. It will be remembered that TCO-A relay 1120 is operated, hence ground will be extended from conductor 1138 over the armature 3 and front contact of TCO-A relay 1120, conductor 1139, to the contacts controlled by the B relays in Fig. 9, where by the principles of biquinary addition whose special application in the present instance will be more fully explained hereinafter it will produce a summing operation resulting in the energization of either W0 relay 1404 or WN0 relay 1405, either V0 relay 1302 or VN0 relay 1304 and either UT relay 1212 or UNT relay 1217.

In each of these pairs of relays the 0 relay indicates that the sum in its particular denominational order is zero and the N0 relay indicates that the sum is not zero. In the U order the UT relay indicates that the sum is an even ten such as 10 or 20 and the UNT indicates that the sum is other than such an even number. In this special application of summing the sum relays need be only two in number for each denominational order for we are only interested in knowing whether the sum is or is not a given number. In the present case we are interested in finding in the interpolator tape the block number 182. Hence we want to produce the following sum

```
  0  carry in
183  registered in the B relays
817  complement of 182 in A relays
----
1000 in the sum relays
```

Hence we are interested in finding an interpolator block number which will result in the operation of the UT relay 1212, the V0 relay 1302 and the W0 relay 1040.

Let us suppose that the number just read off the interpolator tape produces this result. As a consequence, a circuit will be established from ground, the front contact and armature 1 of W0 relay 1404, conductor 1401, front contact and armature 1 of V0 relay 1302, conductor 1306, front contact and armature 1 of UT relay 1212, the winding of CCK relay 1211 to battery, resulting in the operation of this latter relay. The operation of relay 1211 opens the circuit closed by the WUP relay 1210 and stops further functioning of this interpolator control circuit until at some later stage the (T-1) relay 1140 relay is operated. In the meantime the original energizing circuit for the AADC relay 1137 is opened but this relay remains locked to the ground at armature 7 of the STC relay 1105. The carry in 0 ground will be maintained and the locking circuits for the A and B relays of the three-digit adder will be held under control of the SG-1 relay 1118.

Now let it be assumed that the block number encountered is 181, one less than that sought. The summing result will be

```
  0  carry in
183  registered in the B relays
818  complement of 181 in the A relays
----
1001 in the sum relays
```

The UT relay 1212, the V0 relay 1302 and the WN0 relay 1406 will respond. Relay 1211 will not operate in this instance since no ground is supplied to conductor 1407. However, a circuit is closed from ground at armature 2 and front contact of WN0 relay 1405, conductor 1408 to the winding of TBA relay 1214 to battery. Relay 1214 operates and closes the ground for the energization of the UT relay 1212 through the front contact and armature 2 of relay 1214, through the upper winding of TAA relay 1212. This relay opens the same circuit as the CCK relay 1211 and in addition causes the release of the SG-2 relay 1102. Relay 1103 causes the general release of the interpolator control circuit with the exception of the SG-1 relay 1118 and those circuits under its control. Thereupon the hunting operations as hereinbefore described will take place and the next higher block number will be sought. This action will be repeated until the operations finally result in the operation of the CCK relay 1211.

Let us now assume that the block number encountered is 183, one more than that sought. The summing result will be

```
  0  carry in
183  registered in the B relays
816  complement of 183 in the A relays
----
999  in the sum relays
```

The UNT relay 1217, the VN0 relay 1304 and the WN0 relay 1405 will respond. The TBA relay 1214 will respond as before. In this case the UNT relay 1217 will be operated through its lower winding and ground will be extended over its front contact and armature 3, the front contact and armature 3 of TBA relay 1214, the upper winding of TAB relay 1201 to battery. Relay 1201 produces the same results as relay 1202 and in addition causes the operation of TA-RV relay 1113. This relay through its armature 4 places ground on conductor 1141 leading through the tape reverse magnet 1016 so that when the tape is next moved it will be moved backwardly. This backward movement will be continued at high speed until the next block number signal is received, whereupon the operation of LTS-1 relay 1123 will release the TA-RV relay 1113 and the tape may be moved forwardly step by step to read off the block number just found. Further details of these operations will be found hereinafter in the complete description of the circuits.

Another point should be noted. The TARV relay upon operation locks over its front contact and armature 3, armature 3 and back contact of LTS relay 1122, and armature 6 and front contact of SG-1 relay 1118 to ground. Now during the operation of TAB relay 1201 the lead to SG-2 relay 1102 is opened so that this relay generally releases the circuits of Fig. 11. Relay 1201 also opens the circuit of the relay 1137 so that this removes ground from the carry in lead which in turn releases relay 1201. Thereupon SG-2 relay 1102 operates and starts the operations over. Now the tape will start moving backwardly and the first three codes passed will be the codes for the block number just registered and tested. Each of these codes will have one or more spacing elements and therefore during this start movement the PPB relay 1108 will operate as before to cause PPC relay 1111 to operate and prepare PPE relay 1110 for operation. Now the two five-hole codes which heretofore stopped the tape before this block number will be passed through the transmitter but must not be allowed to stop the tape on this backward movement thereof. Upon the operation of the PPC relay 1111 the PPD relay 1106 is operated and will lock to a circuit including at least one spacing contact of the transmitter so that relay 1106 will remain operated until a five-hole code is reached. As soon as PPD relay 1106 is operated PPB relay 1108 will release and this will cause PPE relay 1110 to operate. This relay now causes the operation of PPF relay 1112 rather than the PPH relay as heretofore described. Hence when the first of the two five-hole codes is reached PPD relay 1106 releases and places PPB relay 1108 again in circuit.

Under conditions heretofore described during the forward movement of the tape, the release of PPD relay 1106 would open the circuit of the stop magnet 1003, but now that PPF relay 1112 is operated this stop magnet will be continuously energized in a circuit from ground, armature 3 and front contact of PPF relay 1112, armature 3 and back contact of PPH relay 1107 to the front contact of armature 2 of PPD relay 1106. Thus the tape will be kept moving. In between the two five-hole codes PPB relay 1108 may operate for an instant but this is ineffective since it results in short-circuiting the winding of PPE relay 1110 which naturally renders the relay slow to release. Before it can release the second of the five-hole codes is encountered, PPB relay 1108 releases and PPE relay 1110 is energized anew to hold it continuously operated. Since the original operating circuit of PPD relay 1106 is opened by the PPF relay 1112 it remains released, so that after the two five-hole codes have passed through the transmitter the PPB relay 1108 may become continuously operated. This causes the short circuit to be applied to the winding of PPE relay for a sufficient length of time to cause its release. Thereupon the original ground for the energization of relay 1112 is removed and the PPG relay 1142 operates in a circuit from ground, armature 2 and front contact of PPC relay 1111, armature 1 and front contact of PPF relay 1112, winding of PPG relay 1142 and winding of PPF relay 1112 to battery. Relay PPG through its armature 1 now closes the circuit for PPD relay 1106 so that this relay now operates and locks through the spacing contacts of the transmitter as heretofore. The PPC relay 1111 has remained operated, so that as relay 1106 operates and releases PPB relay 1108 the PPE relay will again operate. By this time however, the PPG relay 1142 has operated and therefore the reoperation of PPE relay 1110 causes the operation of PPH relay as heretofore so that upon the next encounter of a five-hole code the PPD relay will release and close the circuit to the LTS relay 1122 with the result hereinbefore described. Thus means is provided when the tape is moved backwardly to ride over one set of stop signals and proceed to another set.

*Summing for test purposes*

Figure 18:
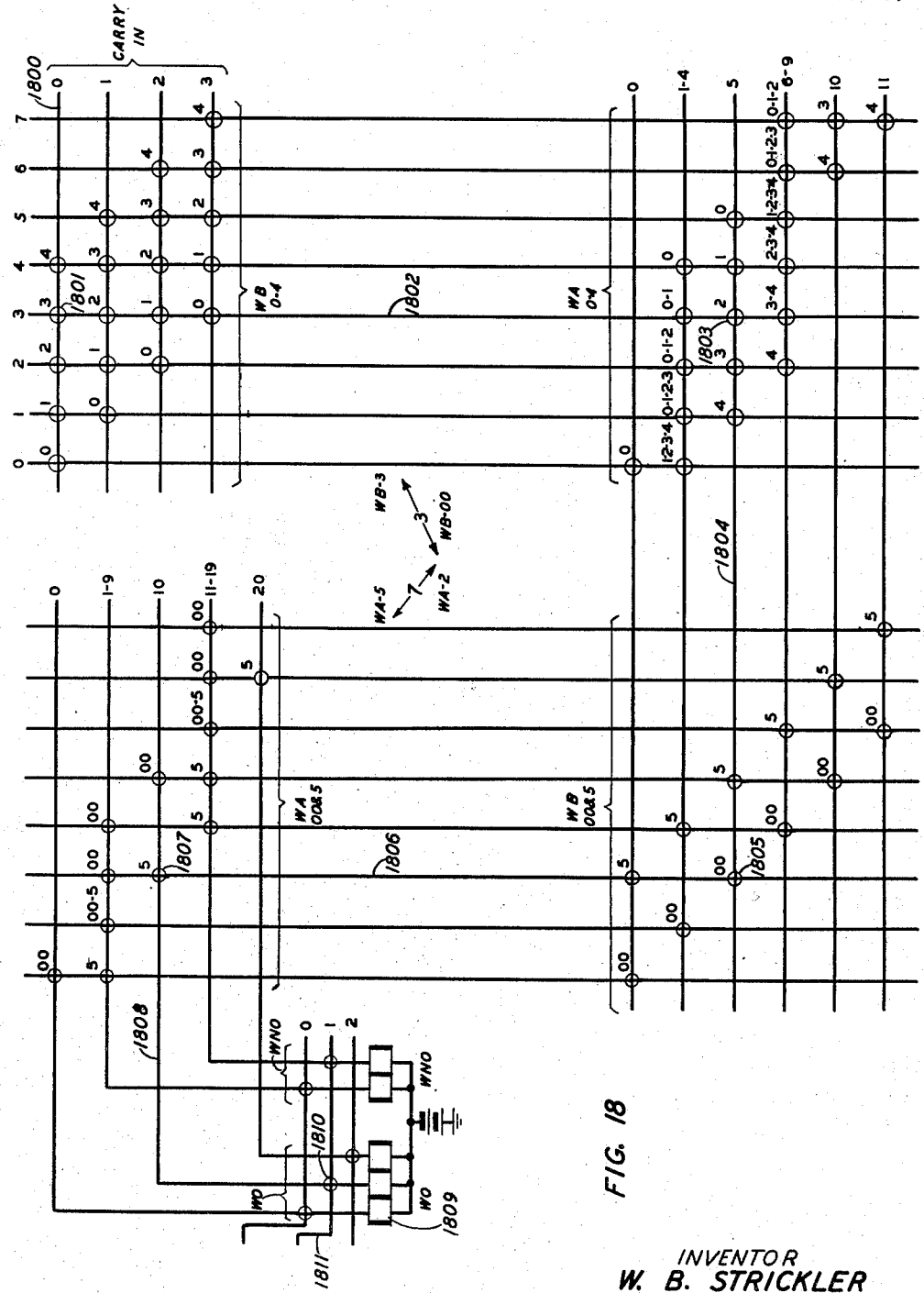
Fig. 18 shows the circuits which may be traced through the contacts of the W or units order of the three-digit adder.

In each of Figs. 16, 17 and 18 there are shown four groups of relay contacts represented by small circles each ringed about the crossing point of two conductors. Each such circle represents normally open contacts of a relay designated by a small number placed near such circle and a further designation indicated by a bracket including all the contacts of a particular group of relays. Thus the upper right-hand group of relay contacts in Fig. 18 are those of the WB relays of which there are five known as the WB-0, WB-1, WB-2, WB-3 and WB-4. The four groups in each figure represent the binary and quinary groups of the A and the B relays of the three-digit adder. There are also shown in each figure the windings and certain contacts of the sum relays, such as W0 and WN0 in Fig. 18, V0 and VN0 in Fig. 17 and UT and UNT in Fig. 16. In most cases but a single relay is employed to establish a connection between two wires crossing each other but in other cases two or more relays may make the same connection. This is because this three-digit adder is used for a special purpose and it is only necessary to know whether the sum of the digits in any order is zero or not zero.

The A and B relays are arranged on the biquinary basis, those in the binary group being designated 00 and 5 and those in the quinary group being designated 0, 1, 2, 3 and 4.

By way of example, let us suppose that the number 183 is registered in the B relays. This would mean that the following relays had been operated and were locked in:

UB-00  UB-1  VB-5  VB-3  WB-00  WB-3

Now if the block numbered 182 had been found the A relays would be operated to the complement (817) of 182 and the following relays would have been operated and locked in:

VA-5  VA-3  VA-00  VA-1  WA-5  WA-2

The summing will take place when a ground is connected to one of the carry in leads which in the present instance number four, being those for carry in 0, carry in 1, carry in 2 and carry in 3. If we now suppose that the carry in 0 conductor is grounded, we may trace a circuit from ground on carry in 0 conductor, contact 1801, controlled by relay WB-3, conductor 1802, contact 1803 controlled by relay WA-2, conductor 1804, contact 1805, controlled by relay WB-00, conductor 1806, contact 1807 controlled by relay WA-5, conductor 1808 to a winding of W0 relay 1809. The W0 relay which indicates that the sum of 0+3+2+0+5 is zero with a carry out 1, operates and through its contact 1810 extends ground over conductor 1811, contact 1700 controlled by the VB-3 relay, conductor 1701, contact 1702 controlled by the VA-1 relay, conductor 1703, contact 1704 controlled by the VB-5 relay, conductor 1705, contact 1706 controlled by the VA-00 relay, conductor 1707 through a winding of the V0 relay 1708. The V0 relay which indicates that the sum of 1+3+1+5+0 is zero with a carry out 1, operates and through its contact 1709 extends ground to conductor 1710, contact 1600 controlled by relay UB-1, conductor 1601, contact 1602 controlled by the UA-3 relay, conductor 1603, contact 1604 controlled by the UB-00 relay, conductor 1605, contact 1606 controlled by the UA-5 relay, conductor 1607 through a winding of the UT relay 1608 to battery. The UT relay 1608 which indicates that the sum of 1+1+3+0+5 is zero with a carry out 1 operates and through its contact 1609 extends ground over conductor 1610 through the TAA relay 1612 to battery which operates with the consequences hereinbefore described. The principle of this arrangement may be applied in many different ways to suit any given or desired arrangement. The number of carry in leads which may be employed is unlimited and they may be brought in not only to the lowest denominational order but to the other orders as well so that two or more digit carry in leads may be used. The conductor 1811 is in reality a carry in lead to the tens denominational order of Fig. 17 and is one of three carry in 0, carry in 1 and carry in 2 leads. Others may be provided as occasion demands.

What is claimed is:

1. An adder having a plurality of decimal denominational orders, each said order having means for representing an augend, an addend, and one means for representing a particular sum and another means for representing anything other than said particular sum, a plurality of carry in elements and a plurality of carry out elements, the said carry out elements of each order being permanently associated with the corresponding carry in elements of the next higher denominational order and means responsive to the activation of a carry in element of the lowest of said denominational orders for operating said sum elements and activating said carry out elements.

2. An adder having a plurality of decimal denominational orders, each said order having an augend element consisting of a plurality of code operated relays, an addend element consisting of a plurality of code operated relays, a plurality of incoming carry circuits, a plurality of outgoing carry circuits, a sum relay responsive to a particular units value of a sum derived in said order and a sum relay responsive to all other than said particular units value of said sum, circuits for said sum relays controlled by said carry in leads, contacts of said augend relays and contacts of said addend relays, said carry out circuits being controlled by said sum relays, said carry out circuits of one decimal denominational order being connected to corresponding carry in leads of a next higher decimal denominational order.

3. An adder having a plurality of decimal denominational orders, each said order including a set of augend relays, a set of addend relays, a pair of sum relays one responsive to a sum whose units digit is zero and another responsive to a sum whose units digit is any one of the values 1 to 9, inclusive, a plurality of different valued carry in leads and a plurality of different valued carry out leads, the said carry out leads of one decimal denominational order being connected to and becoming the correspondingly valued carry in leads of the next higher decimal denominational order, said sum relays of any of said orders being operated over a path selectively closed from an activated carry in lead through contacts controlled by said augend and said addend relays, said operated one of said sum relays having contacts to extend its activating circuit to one of said carry out leads, whereby a selectively activated carry in lead to the extreme right-hand denominational order will extend its activating condition to one of said carry out leads from the extreme left-hand denominational order, while said sum relays will indicate that the sum after the value represented by said activated carry out lead is or is not zero.

4. In a tape controlled calculating device, a tape transmitter for reading codes recorded on a tape, a first circuit for translating said codes for use, a second circuit for rendering said first circuit ineffective, said second circuit being constructed and arranged to respond to a particular code to render said first circuit effective, means for driving said transmitter either forwardly or backwardly, a third circuit for determining the direction in which said transmitter shall be driven and means responsive to the operation of said third circuit to control a backward movement of said transmitter to cause said second circuit to override a first of said particular codes.

5. In a tape controlled calculating device, a tape transmitter for reading codes recorded on a tape, a reversing magnet for said transmitter, means for operating said reversing magnet, a driving magnet for said transmitter, a circuit which may be locked in for operating said driving magnet, said circuit being responsive to a particular code read by said transmitter to unlock and deenergize said driving magnet and means responsive to said means for operating said reversing magnet for rendering said locking circuit unresponsive to the first occurrence of said particular code.

6. In a tape controlled calculating device, a reversible tape transmitter for reading codes recorded on a tape, means for setting said transmitter in motion, means responsive to a particular code for stopping the motion of said transmitter and means responsive to reverse movement of said transmitter for nullifying the operation of said stopping means on the first passage of said particular code through said transmitter.

7. In a tape controlled calculating device, a reversible tape transmitter for reading codes recorded on a tape, a tape for use in said transmitter having recorded therein groups of codes, each said group consisting of a series of numbers comprising first a group number identification signal, second a multidigit group number and thereafter mathematical information, said group numbers being serially arranged, circuit means for designating a particular group number for use, means for starting the operation of said transmitter and running it continuously until a group number identification signal reaches said transmitter, and means responsive to said group number identification signal for stopping the said continuous movement of said transmitter and for initiating a step-by-step movement thereof for reading the adjacently recorded group number from said tape.

8. In a tape controlled calculating device, a reversible tape transmitter for reading codes recorded on a tape, a tape for use in said transmitter having recorded therein groups of codes, each said group consisting of a series of numbers comprising first a group number identification signal, second a multidigit group number and thereafter mathematical information, said group numbers being serially arranged, circuit means for designating a particular group number for use, means for starting the operation of said transmitter and running it continuously until a group number identification signal reaches said transmitter, means responsive to said group number identification signal for stopping the said continuous movement of said transmitter and for initiating a step-by-step movement thereof for reading the adjacently recorded group number from said tape, means for comparing said recorded group number with the designated particular group number, means responsive to a match of said numbers for advancing said tape to read off the said mathematical information and means responsive to a mismatch of said numbers for starting said transmitter to hunt for the next group number.

9. In a tape controlled calculating device, a reversible tape transmitter for reading codes recorded on a tape, a tape for use in said transmitter having recorded therein groups of codes, each said group consisting of a series of numbers comprising first a group number identification signal, second a multidigit group number and thereafter mathematical information, said group numbers being serially arranged, circuit means for designating a particular group number for use, means for starting the operation of said transmitter and running it continuously until a group number identification signal reaches said transmitter, means responsive to said group number identification signal for stopping the said continuous movement of said transmitter and for initiating a step-by-step movement thereof for reading the adjacently recorded group number from said tape, means for comparing said recorded number with the designated particular group number, means responsive to a match of said numbers for advancing said tape to read off the said mathematical information, means responsive to a mismatch of said numbers for starting said transmitter to hunt for the next recorded group number, means for indicating the direction of movement of said tape in the ensuing hunting operation and means responsive to a directed reverse movement thereof for maintaining the said continuous movement of said transmitter as the first of said recorded group number identification signal passes therethrough.

10. In a testing system, a medium in which information is recorded in a plurality of positions each characterized by a different position number also recorded therein, said medium having a plurality of items of information recorded therein at each said position, moving means for moving said medium from position number to position number and from item to item of information within a selected position, sensing means for sensing each said position number recorded in said medium as said medium is moved successively from position number to position number, means for selecting one of said position numbers comprising a calculator having augend, addend and sum elements, means for setting one of said augend and addend elements to the value of the selected one of said position numbers, setting means responsive to said sensing means for correspondingly setting the other of said augend and addend elements to a value representing the value of each said position number sensed by said sensing means, summing means for setting said sum element to the value of the sum of the values set in said addend and said augend elements, means responsive to predetermined settings of said sum element, indicating that the sensed position number and said selected one of said positioned numbers are unequal, for controlling said moving means to move said medium to the next successively recorded position number in said medium and means responsive to the setting of said sum element to a different predetermined setting, indicating that a sensed position number and said selected one of said positioned numbers are equal, for controlling said moving means to halt further position number to position number movement of said medium.

11. In a testing system, a medium in which information is recorded in a plurality of positions each characterized by a different position number also recorded therein, said medium having a plurality of items of information recorded therein at each said position, moving means for moving said medium from position number to position number and from item to item of information within a selected position, sensing means for sensing each said position number recorded in said medium as said medium is moved successively from position number to position numbers, means for selecting one of said position numbers comprising a calculator having augend, addend and sum elements, means for setting said addend element to the value of the selected one of position numbers, setting means responsive to said sensing means for setting said augend element to the value of the complement of each said position number in said medium sensed by said sensing means, summing means for setting said sum element to the value of the sum of the values set in said addend and said augend elements, a control means responsive to the settings of said sum element to represent values other than zero in each of its denominational orders, indicating that a sensed position number is different from said selected one of said position numbers, for controlling said moving means to move said medium to the next successively recorded position number in said medium and a second controlling means responsive to the setting of said sum element to a zero value, indicating that a sensed position number is the same as said selected one of said position numbers, for controlling said moving means to halt the position number to position number movement of said medium.

12. In a testing system, a medium in which information is recorded in a plurality of positions each characterized by a different position number also recorded therein, said medium having a plurality of items of information recorded therein at each said position, moving means for moving said medium from position number to position number and from item to item of information within a selected position, sensing means for sensing each said position number recorded in said medium as said medium is moved successively from position number to position number, means for selecting one of said position numbers comprising a calculator having augend, addend and sum elements, means for setting one of said augend and addend elements to the value of the selected one of said position numbers, setting means responsive to said sensing means for correspondingly setting the other of said augend and addend elements to a value representing the value of each said position number sensed by said sensing means, summing means for setting said sum element to the value of the sum of the values set in said addend and said augend elements, means responsive to the settings of said sum element to represent values other than zero, indicating that a sensed position number and said selected one of said position numbers are unequal, for controlling said moving means to move said medium to the next successively recorded position number in said medium and means responsive to the setting of said sum element to a zero value, indicating that a sensed position number and said selected one of said position numbers are equal, for controlling said moving means to halt the position number to position number movement of said medium and to initiate the item to item movement thereof.

13. In a testing system, a medium in which information is recorded in a plurality of positions each characterized by a different position number also recorded therein, said medium having a plurality of items of information recorded therein at each said position, moving means for moving said medium from position number to position number and from item to item of information within a selected position, sensing means for sensing each said position number recorded in said medium as said medium is moved successively from position number to position number, means for sequentially selecting a desired serially numbered plurality of good positions comprising a calculator having an augend element, an addend element, a sum element and a plurality of carry in elements, each of said carry in elements representing a different carry in value and the values of said carry in elements being a consecutive numerical series, means for setting said augend element to the value of a given position number, setting means responsive to said sensing means for setting said addend element to a value representing the value of each said position number sensed by said sensing means, selecting means for selecting the one of said carry in elements representing a carry in value which, when summed with the value of said given position number and the value representing the lowest valued position number of said desired serially numbered plurality of positions, will produce a sum of zero value, summing means for setting said sum element to the value of the sum of the value set in said addend element, the value set in said augend element and the value of the selected one of said carry in elements, means responsive to the setting of said sum element to represent sum values other than zero in any of its denominational orders for controlling said moving means to move said medium to the next successive recorded position number in said medium, means responsive to the setting of said sum element to a zero sum value in each of said denominational orders for controlling said moving means to halt further position number to position number movement of said medium and means for sequentially selecting other numbered positions of said desired serially numbered plurality of said positions which are serially related to said lowest valued position number including means for controlling said selecting means to select carry in elements representing successively higher carry in values.

14. In a testing system, a medium in which information is recorded in a plurality of positions each characterized by a different position number also recorded therein, moving means for moving said medium either forwardly or backwardly from position number to position number, sensing means for sensing each said position number recorded in said medium as said medium is moved successively from position number to position number, a calculator having augend, addend and sum elements, means for setting said addend element to the value of the desired position number characterizing the position to which it is desired to move said medium, setting means responsive to said sensing means for setting said augend element to the value of the complement of each said position number in said medium sensed by said sensing means, summing means for setting said sum element to the value of the sum of the values set in said addend and said augend elements, means responsive to the settings of said sum element to a sum value, positive or negative with respect to zero, indicating that a sensed position number is either less or greater, respectively, than said desired position number, for controlling said moving means to move said medium either forwardly or backwardly, respectively, to the next successively recorded position number in said medium and means responsive to the setting of said sum element to a zero sum value, indicating that a sensed position number and the said desired position number are equal, for controlling said moving means to halt further position number to position number movement of said medium.

15. In a testing system, a medium in which information is recorded in a plurality of positions each characterized by a different position number also recorded therein, moving means for moving said medium either forwardly or backwardly from position number to position number, sensing means for sensing each said position number recorded in said medium as said medium is moved successively from position number to position number, a calculator having an augend element, an addend element, a sum element and a plurality of carry in elements, means for setting said addend element to the value of a given position number, setting means responsive to said sensing means for setting said augend element to the value of the complement of each said position number in said medium sensed by said sensing means, means for setting the value in said carry in elements which, when summed with the value of said given position number and the value of the complement of a desired position number characterizing the position to which it is desired to move said medium, will produce a sum of zero value, summing means for setting said sum element to the value of the sum of the values set in said addend element, said augend element and said carry in elements, means responsive to the settings of said sum element to sum values positive with respect to zero, indicating that a sensed position number is less than said desired position number, for controlling said moving means to move said medium forwardly to the next successively recorded higher position number in said medium, means responsive to the setting of said sum element to sum values, negative with respect to zero, indicating that a sensed position number is greater than said desired position number, for controlling said moving means to move said medium backwardly to the next successively recorded lower position number in said medium and means responsive to the setting of said sum element to a zero sum value, indicating that a sensed position number and the said desired position number are equal for controlling said moving means to halt further position number to position number movement of said medium.

16. In a testing system, a medium in which is recorded a plurality of groups of information, each of said groups of information being characterized by a differently valued position number also recorded in said medium, said groups of information being recorded in said medium in the consecutive order of their respective position numbers, a transmitting means for moving said medium either forwardly or backwardly from position number to position number and sensing each said position number as said medium is moved, a calculator having an augend element, an addend element, a sum element and a plurality of carry in elements, means for setting said addend element to the value of a given position number, setting means responsive to said transmitting means for setting said augend element to a value representing the value of each said position number sensed by said transmitting means, means for setting a value in said carry in elements which, when summed with the value of said given position number and the value representing the value of a desired position number characterizing the position to which it is desired to move said medium, will produce a sum of a given digital value in every denominational order in said calculator, summing means for setting said sum element to the value of the sum of the values set in said addend element, said augend element and said carry in elements, means responsive to the settings of said sum element to a sum value positive or negative with respect to said given digital value in any of its denominational orders for controlling said transmitting means to move said medium either forwardly or backwardly, respectively, to the next successively recorded position number in said medium and means responsive to the setting of said sum element to a sum of said given digital value in each of its denominational orders for controlling said transmitting means to halt the position number to position number movement of said medium.

17. In a testing system, a perforated tape such as that used in the art of the printing telegraph, said tape being perforated with groups of codes, each of said groups of codes starting with a perforated group number code representing a group identifying number, said groups of codes being perforated in said tape in the consecutive order of their respective group identifying numbers, a tape transmitter for moving said tape from group number code to group number code, a sensing means in said tape transmitter for sensing each of said group number codes in said tape as said tape is moved from group number code to group number code by said tape transmitter, an adder comprising an addend element, an augend element and a sum element, means for setting said addend element to a value of an arbitrary given number, means responsive to said sensing means for setting said augend element to a value representing the value of each said group identifying number sensed by said sensing means, summing means for setting said sum element to the value of the sum of the values set in said addend and said augend elements, means responsive to the setting of said sum element to values other than zero for controlling said tape transmitter to move said tape to the next successively perforated group number code in said tape and means responsive to the setting of said sum element to a zero sum value for controlling said tape transmitter to halt further group number code to group number code movement of said tape.

18. In a testing system, a tape perforated in code in the manner common in the printing telegraph art, said tape containing coded information in groups of code perforations each said group preceded by a code perforation representing a group identifying number, a tape transmitter having means for moving said tape therethrough in either direction and translating means for sensing and translating said code perforations in said tape into electrical characterizations, a calculator having an augend element, an addend element and a sum element, means for setting said addend element to the value of a given group identifying number, means responsive to electrical characterizations produced by said translating means from each said code perforation representing a group identifying number in said tape for setting said augend element to the value of the complement of each said group identifying number sensed and translated by said translating means as said tape is moved through said transmitter, summing means for setting said sum element to the value of the sum of the values set in said addend and said augend elements, a first means responsive to predetermined settings of said sum element, indicating that a group identifying number sensed and translated by said translating means is less in value than said given group identifying number, for controlling said transmitter to move said tape forwardly to the next successive code perforation in said tape representing the next higher valued group identifying number, a second means responsive to other predetermined settings of said sum element, indicating that a group identifying number sensed and translated by said translating means is greater in value than said given group identifying number for controlling said transmitter to move said tape backwardly to the next successive code perforation in said tape representing the next lower valued group identifying number and a third means responsive to a different predetermined setting of said sum element, indicating that a group identifying number sensed and translated by said translating means is equal in value to said given group identifying number, for controlling said transmitter to halt the movement of said tape.

19. In a testing system, a medium in which is recorded in code a plurality of groups of data, each of said groups of data being preceded by an identifying position number also recorded in code in said medium, said groups of data being recorded in said medium in the consecutive order of their respective identifying position numbers, a special signal code being recorded in said medium before each said position number, high speed moving means for moving said medium at a comparatively high speed either forwardly or backwardly, slow speed moving means for moving said medium forwardly at a comparatively slow speed, sensing means effective during the high speed movement of said medium for sensing said medium, means responsive to the sensing by said sensing means of each said special signal code recorded in said medium for controlling said high speed moving means to halt said high speed movement of said medium and for controlling said slow speed moving means to initiate the slow speed movement of said medium, a calculator having augend, addend and sum elements, said augend and said addend elements being responsive to electrical signals representing position numbers, means for transmitting electrical signals representing a given position number to said addend element whereby said addend element is set to represent the value of said given position number, means effective during said slow speed movement of said medium for sensing the code in said medium representing the position number to which said medium has been moved during said high speed movement and for transmitting electrical signals representing the complement of the value of the sensed position number to said augend element whereby said augend element is set to represent the value of the complement of said sensed position number, summing means for setting said sum element to the value of the sum of the values set in said addend and said augend elements, means responsive to the setting of said sum element to a sum value, positive or negative with respect to zero, indicating that a sensed position number is either less or greater, respectively, than said given position number for controlling said high speed moving means to move said medium either forwardly or backwardly, respectively, at a comparatively high speed to the next successively recorded special signal code preceding the next successively recorded higher valued or lower valued position number, respectively, and further means responsive to the setting of said sum element to a zero sum value, indicating that a sensed position number and said given position number are equal, for controlling said high speed moving means and said slow speed moving means to halt further movement of said medium.

20. In a testing system, a medium in which is recorded in code a plurality of groups of data, each of said groups of data being preceded by an identifying position number also recorded in code in said medium, said groups of data being recorded in said medium in the serial order of their respective identifying position numbers, moving means for moving said medium either forwardly or backwardly from position number to position number, a calculator having an augend element, an addend element, a plurality of carry in elements, a plurality of carry out elements and a sum element, said augend and said addend elements being responsive to electrical characterizations representing position numbers, each of said carry in elements representing a different carry in value and each of said carry out elements representing a different carry out value, said sum element comprising a pair of subelements for each decimal denominational order of said calculator, the first subelement of each pair of said subelements being responsive to the setting of a given sum in its associated decimal denominational order in said calculator and the second subelement of each pair of said subelements being responsive to the settings of all sums other than said given sum in its associated decimal denominational order in said calculator, means for transmitting electrical characterizations representing a given position number to said addend element whereby said addend element is set to represent the value of said given position number, means for selecting the one of said carry in elements representing a desired carry in value, sensing means for sensing each code in said medium representing a position number as said medium is moved from position number to position number and for transmitting electrical characterizations representing the complement of the value of a sensed position number to said augend element whereby said augend element is set to represent the value of the complement of said sensed position number, summing means for setting said sum element to the value of the sum of the value set in said addend element, the value set in said augend element and the value represented by said selected one of said carry in elements, means controlled by the operation of said first subelement of each pair of said subelements in response to the setting of a given sum in each decimal denominational order in said calculator for controlling said moving means to halt further movement of said medium and further means controlled by said carry out elements and said second subelement of each pair of said subelements when operated in response to the setting of any sum other than said given sum in each decimal denominational order in said calculator for controlling said moving means to move said medium, the direction of movement of said medium being selectively responsive to the different said carry out elements.

References Cited in the file of this patent

UNITED STATES PATENTS

| Number | Name | Date |
|---|---|---|
| 2,074,392 | Herbst | Mar. 23, 1937 |
| 2,098,248 | Keefe | Nov. 9, 1937 |
| 2,098,359 | Reynolds | Nov. 9, 1937 |
| 2,146,834 | McCain | Feb. 14, 1939 |
| 2,254,932 | Bryce | Sept. 2, 1941 |
| 2,386,763 | Williams | Oct. 16, 1945 |
| 2,393,386 | Leathers | Jan. 22, 1946 |
| 2,616,624 | Lake et al. | Nov. 4, 1952 |

FOREIGN PATENTS

| Number | Country | Date |
|---|---|---|
| 600,896 | Great Britain | Apr. 21, 1948 |